United States Patent
Yoo et al.

(10) Patent No.: US 11,282,501 B2
(45) Date of Patent: Mar. 22, 2022

(54) SPEECH RECOGNITION METHOD AND APPARATUS

(71) Applicants: Samsung Electronics Co., Ltd., Suwon-si (KR); Universite De Montreal, Montreal (CA)

(72) Inventors: Sanghyun Yoo, Seoul (KR); Yoshua Bengio, Montreal (CA); Inchul Song, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 214 days.

(21) Appl. No.: 16/656,700

(22) Filed: Oct. 18, 2019

(65) Prior Publication Data
US 2020/0126534 A1 Apr. 23, 2020

(30) Foreign Application Priority Data
Oct. 19, 2018 (KR) .................. 10-2018-0125070

(51) Int. Cl.
*G10L 15/26* (2006.01)
*G10L 15/06* (2013.01)
(Continued)

(52) U.S. Cl.
CPC .............. *G10L 15/063* (2013.01); *G06N 3/08* (2013.01); *G10L 15/16* (2013.01); *G10L 25/30* (2013.01)

(58) Field of Classification Search
CPC ....... G10L 15/063; G10L 15/16; G10L 25/30; G10L 15/08; G10L 15/005; G10L 15/02;
(Continued)

(56) References Cited

U.S. PATENT DOCUMENTS

| 5,758,022 A | 5/1998 | Trompf et al. |
| 6,424,935 B1 | 7/2002 | Taylor |

(Continued)

FOREIGN PATENT DOCUMENTS

| JP | 4466665 B2 | 5/2010 |
| JP | 6336219 B1 | 6/2018 |

(Continued)

OTHER PUBLICATIONS

Extended European Search Report dated Oct. 31, 2019 in corresponding European Patent Application No. 19193254.0, p. 1-9 (9 pages in English).

*Primary Examiner* — Charlotte M Baker
(74) *Attorney, Agent, or Firm* — NSIP Law

(57) ABSTRACT

A speech recognition method and apparatus, including implementation and/or training, are disclosed. The speech recognition method includes obtaining a speech signal, and performing a recognition of the speech signal, including generating a dialect parameter, for the speech signal, from input dialect data using a parameter generation model, applying the dialect parameter to a trained speech recognition model to generate a dialect speech recognition model, and generating a speech recognition result from the speech signal by implementing, with respect to the speech signal, the dialect speech recognition model. The speech recognition method and apparatus may perform speech recognition and/or training of the speech recognition model and the parameter generation model.

46 Claims, 13 Drawing Sheets

(51) Int. Cl.
  *G06N 3/08* (2006.01)
  *G10L 15/16* (2006.01)
  *G10L 25/30* (2013.01)

(58) Field of Classification Search
  CPC ............... G10L 15/14; G10L 2015/025; G10L 2015/221; G06N 3/08; G06N 3/0454
  USPC .................. 704/235, 253, E15.005, E15.043
  See application file for complete search history.

(56) References Cited

U.S. PATENT DOCUMENTS

| | | |
|---|---|---|
| 7,340,398 B2 | 3/2008 | Lin |
| 8,583,432 B1 | 11/2013 | Biadsy et al. |
| 9,431,011 B2 | 8/2016 | Ljolje et al. |
| 9,589,564 B2 * | 3/2017 | Sharifi ................... G10L 15/02 |
| 9,653,093 B1 | 5/2017 | Matsoukas et al. |
| 2012/0109649 A1 | 5/2012 | Talwar et al. |
| 2019/0371301 A1 | 12/2019 | Yoo et al. |

FOREIGN PATENT DOCUMENTS

| | | |
|---|---|---|
| KR | 10-2014-0066640 A | 6/2014 |
| KR | 10-1624926 B1 | 5/2016 |
| KR | 10-2017-0034227 A | 3/2017 |
| KR | 10-2017-0086214 A | 7/2017 |
| KR | 10-2019-0136578 A | 12/2019 |
| WO | WO 2017/034536 A1 | 3/2017 |

\* cited by examiner

FIG. 2
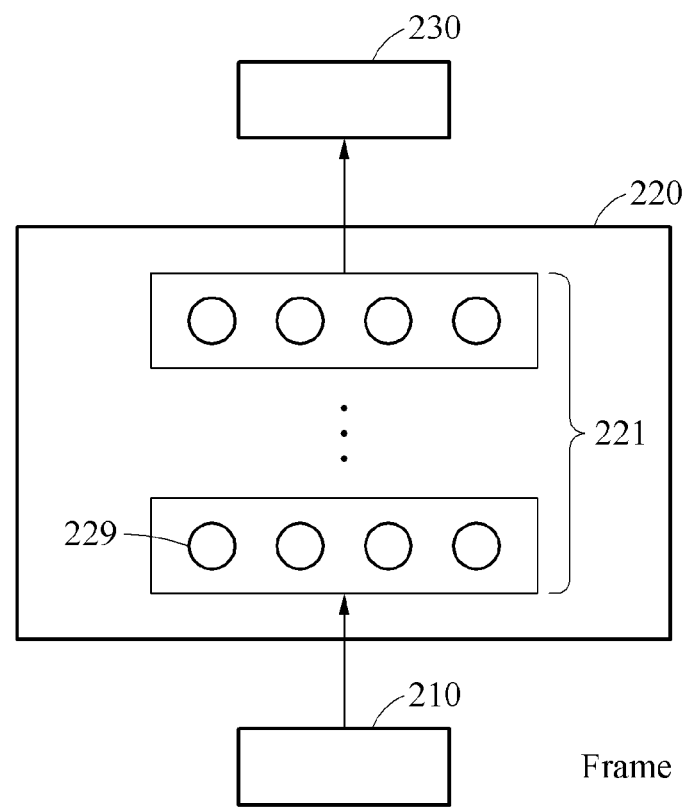
Frame

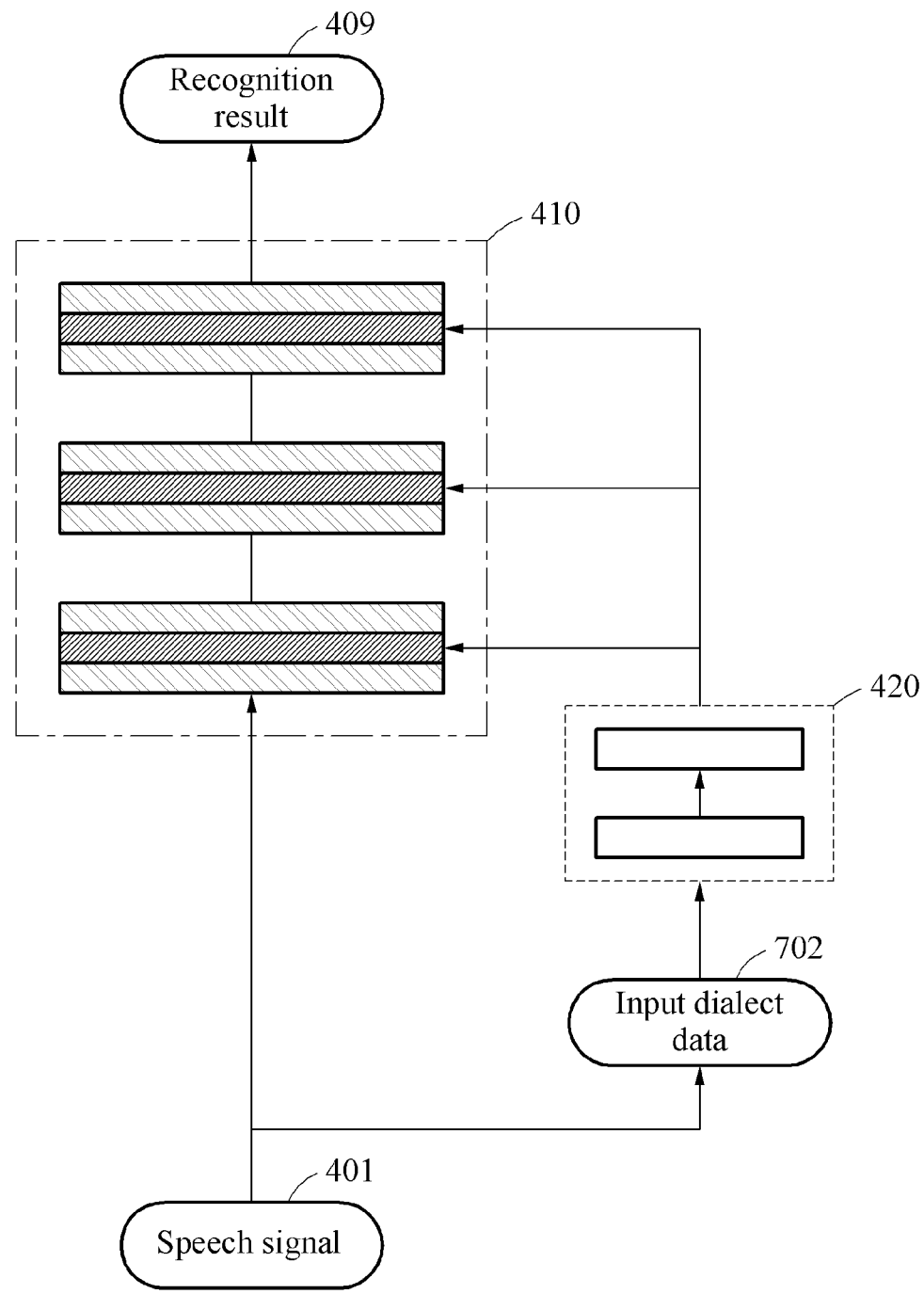

SPEECH RECOGNITION METHOD AND APPARATUS

This application claims the benefit under 35 USC § 119(a) of Korean Patent Application No. 10-2018-0125070 filed on Oct. 19, 2018, in the Korean Intellectual Property Office, the entire disclosure of which is incorporated herein by reference for all purposes.

BACKGROUND

1. Field

The following description relates to speech recognition methods and apparatuses.

2. Description of Related Art

Electronic devices or systems may implement one or more speech recognition models to perform speech or audio recognition, for example, such as where a personal mobile device is configured to recognize an input speech and output a result of the recognizing. This speech recognition, i.e., machine speech recognition, may be a process of converting language information existing in the input speech to text information, for example, corresponding to the input speech. Implementation of the speech recognition model may cause the input speech to be analyzed and thereby producing an estimate, e.g., in the example text form, of the language information included in the input speech. An input to such a speech recognition model may be in a form of a speech sequence, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented speech recognition method includes obtaining a speech signal, and performing a recognition of the speech signal, including generating a dialect parameter, for the speech signal, from input dialect data using a parameter generation model, applying the dialect parameter to a trained speech recognition model to generate a dialect speech recognition model, and generating a speech recognition result from the speech signal by implementing, with respect to the speech signal, the dialect speech recognition model.

The applying of the dialect parameter may include applying the dialect parameter, or the respective dialect parameters generated using the parameter generation model, to at least respective portions of each of one or more layers of the trained speech recognition model.

The trained speech recognition model may be a neural network model with at least the one or more layers, each of the one or more layers including at least a node connected to one or more hierarchically previous layer nodes and/or one or more temporally previous nodes according to respective weighted connections, and the applying of the dialect parameter, or the respective dialect parameters, may include inserting a connection weighting or setting, replacing, or modifying respective connection weights in each of the one or more layers, less than all of the respective weighted connections.

The dialect parameter, or the respective dialect parameters, may further include one or more respective scale matrices, and the applying of the dialect parameter, or the respective dialect parameters, may further include applying, during the implementing of the dialect speech recognition model, the one or more respective scale matrices to respective outputs of one or more hidden layers of the dialect speech recognition model.

The dialect parameter, or the respective dialect parameters, may further include one or more respective batch parameters, where the one or more respective batch parameters may each include a first batch parameter $\gamma$ and a second batch parameter $\beta$, and where the applying of the dialect parameter, or the respective dialect parameters, may further include applying, during the implementing of the dialect speech recognition model, the one or more respective batch parameters to respective inputs to one or more hidden layers of the dialect speech recognition model by, for each of the one or more hidden layers, multiplying a respective input by the first batch parameter $\gamma$ and adding the second batch parameter $\beta$, and forwarding respective results of the applied one or more respective batch parameters respectively to the one or more hidden layers.

The respective inputs may be normalized respective inputs, and the respective batch parameters may be respective batch normalization parameters.

The dialect parameter, or the respective dialect parameters, may further include one or more respective batch parameters, the one or more respective batch parameters may each include a first batch parameter $\gamma$ and a second batch parameter $\beta$, and the applying of the dialect parameter, or the respective dialect parameters, may further include applying, during the implementing of the dialect speech recognition model, the one or more respective batch parameters to respective inputs to one or more hidden layers of the dialect speech recognition model by, for each of the one or more hidden layers, multiplying a respective input by the first batch parameter $\gamma$ and adding the second batch parameter $\beta$, and forwarding respective results of the applied one or more respective batch parameters respectively to the one or more hidden layers. The respective inputs may be normalized respective inputs, and the respective batch parameters may be respective batch normalization parameters.

The trained speech recognition model may be a neural network model with at least the one or more layers, each of the one or more layers including at least a node connected to one or more hierarchically previous layer nodes and/or one or more temporally previous nodes according to respective weighted connections, and the applying of the dialect parameter may include applying a respective scale matrix, as the dialect parameter or as respective dialect parameters generated by the parameter generation model, to respective outputs of corresponding hidden layers of the dialect speech recognition model during the implementing of the dialect speech recognition model.

The dialect parameter may include respective batch parameters, and the applying of the dialect parameter may include applying, during the implementing of the dialect speech recognition model, the respective batch parameters to respective inputs to one or interim operations of the dialect speech recognition model, the inputs being from an input operation of the dialect speech recognition model or from a previous one or more interim operations of the dialect speech recognition model.

The trained speech recognition model may be a neural network model with at least the one or more layers, each of the one or more layers including at least a node connected to one or more hierarchically previous layer nodes and/or one or more temporally previous nodes according to respective weighted connections, and the applying of the respective batch parameters to the respective inputs may include applying the respective batch parameters to respective inputs of one or more hidden layers of the dialect speech recognition model during the implementing of the dialect speech recognition model.

The batch parameter may include a first batch parameter γ and a second batch parameter β, and the applying of the respective batch parameters to the respective inputs to the one or more hidden layers of the dialect speech recognition model may include, for each of the one or more hidden layers, multiplying a respective input by the first batch parameter γ and adding the second batch parameter β, and forwarding respective results of the applied respective batch parameters respectively to the one or more hidden layers. The respective inputs may be normalized respective inputs, and the batch parameter may be a batch normalization parameter.

The batch parameter may include a first batch parameter γ and a second batch parameter β, and the applying of the respective batch parameters to the respective inputs to the one or more interim operations of the dialect speech recognition model, for each of one or more interim operations, may include multiplying a respective input by the first batch parameter γ and adding the second batch parameter β, and forwarding respective results of the applied respective batch parameters respectively to the one or interim operations of the dialect speech recognition model. The respective inputs may be normalized respective inputs, and the batch parameter may be a batch normalization parameter.

The generating of the dialect parameter may include, in response to a user input received by a user, determining dialect information indicated by the user input to be the input dialect data, and generating the dialect parameter from the determined input dialect data using the parameter generation model.

The generating of the dialect parameter may include calculating the input dialect data from the speech signal using a dialect classification model.

The calculating of the input dialect data may include calculating, as the input dialect data and using the dialect classification model, probability data associated with a dialect to which the speech signal belongs from the speech signal.

The calculating of the input dialect data includes determining an output of at least one layer of the dialect classification model to be the input dialect data while calculating further dialect information from the speech signal using the dialect classification model.

The generating of the dialect parameter may include calculating the input dialect data from an output of at least one implemented layer of the dialect speech recognition model.

The input dialect data may be the speech signal.

The parameter generation model, in the use of the parameter generation model to generate the dialect parameter, may consider feature data output from at least respective portions of each of one or more implemented layers of the dialect speech recognition model.

The generating of the dialect parameter may include generating dialect parameters for each of one or more layers of the dialect speech recognition model, based on a consideration of, by the parameter generation model, respective data output from a respective preceding layer of the one or more layers.

The generating of the dialect parameter may include obtaining, as the input dialect data, data indicating a dialect group among dialect groups for the speech signal.

The generating of the dialect parameter may include maintaining previously generated dialect parameters with respect to a previous speech recognition by a previous speech recognition model using previously applied and generated dialect parameters, for use in recognition of subsequently obtained speech signals, until new input dialect data is generated with respect to another user.

The generating of the dialect parameter may include, in response to a determination that a dialect group to which a current user belongs differs from a dialect group to which a previous user belongs, obtaining new input dialect data of the current user as the input dialect data.

The implementing of the dialect speech recognition model may include calculating a result of a recognizing of the speech signal by a unit of phoneme.

The method may further include retraining the parameter generation model based on the speech signal and the input dialect data corresponding to the speech signal.

The method may further include storing in a memory the generated dialect parameter and the input dialect data corresponding to the speech signal, and selectively implementing, in a performed recognition of a subsequent speech, the generating of the dialect parameter for the subsequent speech based on a determination of whether dialect data generated by a dialect classification model for the subsequent speech matches the stored input dialect data, and, when the dialect data is determined to match the stored dialect data, bypassing the generation of the dialect parameter for the subsequent speech, and the implementing of the dialect speech recognition model for the subsequent speech, and implementing the dialect speech recognition model to generate a speech recognition result for the subsequent speech.

The method may further include identifying a language of a user and selecting a trained speech recognition model, from among plural respective different language trained speech recognition models stored in a memory, corresponding to the identified language, where the applying of the dialect parameter may include applying the dialect parameter to the selected trained speech recognition model to generate the dialect speech recognition model.

The generating of the dialect parameter may include dynamically generating a dialect parameter each time a speech signal is obtained.

The generating of the speech recognition result may include obtaining normalized data by normalizing the speech signal, and implementing the dialect speech recognition model with respect to the normalized data to generate the speech recognition result.

In one general aspect, provided is a non-transitory computer-readable storage medium storing instructions that, when executed by a processor, cause the processor to perform any one, and combination, or all operations described herein.

In one general aspect, a speech recognition apparatus includes one or more memories storing a parameter generation model, a trained speech recognition model, and instructions, and a processor, which by executing the instructions is configured to generate a dialect parameter, for an obtained speech signal, from input dialect data using the parameter generation model, apply the generated dialect parameter to the trained speech recognition model to generate a dialect speech recognition model, and generate a speech recognition result through an implementation, with respect to the speech signal, of the dialect speech recognition model to generate the speech recognition result for the speech signal.

The processor may be configured to apply the dialect parameter, or respective dialect parameters generated using the parameter generation model, to at least respective portions of each of one or more layers of the trained speech recognition model.

The trained speech recognition model may be a neural network model with at least the one or more layers, each of the one or more layers including at least a node connected to one or more hierarchically previous layer nodes and/or one or more temporally previous nodes according to respective weighted connections, and the applying of the dialect parameter, or the respective dialect parameters, may include inserting a connection weighting or setting, replacing, or modifying respective connection weights in each of the one or more layers, less than all of the respective weighted connections.

The trained speech recognition model may be a neural network model with at least the one or more layers, each of the one or more layers including at least a node connected to one or more hierarchically previous layer nodes and/or one or more temporally previous nodes according to respective weighted connections, and the applying of the dialect parameter may include applying a respective scale matrix, as the dialect parameter or as respective dialect parameters generated by the parameter generation model, to respective outputs of one or more hidden layers of the dialect speech recognition model during the implementing of the dialect speech recognition model.

The dialect parameter may include respective batch parameters, and the applying of the dialect parameter may include applying the respective batch parameters to respective inputs to one or interim operations of the dialect speech recognition model, the inputs being from an input operation of the dialect speech recognition model or from a previous one or more interim operations of the dialect speech recognition model.

The trained speech recognition model may be a neural network model with at least the one or more layers, each of the one or more layers including at least a node connected to one or more hierarchically previous layer nodes and/or one or more temporally previous nodes according to respective weighted connections, and the applying of the respective batch parameters to the respective inputs may include applying the respective batch parameters to respective inputs to one or more hidden layers of the dialect speech recognition model.

The batch parameter may include a first batch parameter $\gamma$ and a second batch parameter $\beta$, and the applying of the respective batch parameters to the respective inputs to the one or more hidden layers of the dialect speech recognition model may include, for each of the one or more hidden layers, multiplying a respective input by the first batch parameter $\gamma$ and adding the second batch parameter $\beta$, and forwarding respective results of the applied respective batch parameters respectively to the one or more hidden layers.

The respective inputs may be normalized respective inputs, and the batch parameter may be a batch normalization parameter.

The processor may be configured to determine, to be the input dialect data, dialect information indicated by a user input received from a user, and generate the dialect parameter from the determined input dialect data using the parameter generation model.

The processor may be configured to calculate the input dialect data from the speech signal using a dialect classification model.

The input dialect data may be the speech signal.

The parameter generation model, in the use of the parameter generation model to generate the dialect parameter, may consider feature data output from at least respective portions of each of one or more layers of the dialect speech recognition model.

The applying of the generated dialect parameter to the trained speech recognition model and the generation of the speech recognition results may be performed concurrently by the processor, and the processor may be configured to generate dialect parameters for each of one or more layers of the trained speech recognition model based on a consideration of, by the parameter generation model, respective data output from a respective preceding layer of the one or more layers of the dialect speech recognition model.

The apparatus may further include a microphone, wherein the processor is further configured to control the microphone to capture the speech signal for the obtaining of the speech signal.

In one general aspect, a speech recognition apparatus includes one or more memories storing a parameter generation model, a dialect classification model, a trained speech recognition model, and instructions, where the trained speech recognition model is a neural network model with at least the one or more layers, each of the one or more layers including at least a node connected to one or more hierarchically previous layer nodes and/or one or more temporally previous nodes according to respective weighted connections, and a processor, which by executing the instructions is configured to generate an input dialect data, by using the dialect classification model with respect to an obtained speech signal, where the input dialect data is a determined indication of a classified dialect of the speech signal or probabilistic data of a complex dialect of the speech signal, generate respective dialect parameters from the input dialect data using the parameter generation model, apply the respective dialect parameters to the trained speech recognition model to generate a dialect speech recognition model, and generate a speech recognition result through an implementation, with respect to the speech signal, of the dialect speech recognition model to generate the speech recognition result for the speech signal, wherein the applying of the respective dialect parameters includes inserting a connection weighting or setting, replacing, or modifying respective connection weights in each of the one or more layers, less than all of the respective weighted connections.

Other features and aspects will be apparent from the following detailed description, the drawings, and the claims.

BRIEF DESCRIPTION OF THE DRAWINGS

FIG. 2 is a diagram illustrating an example of a speech recognition model.

FIGS. 7, and 8A and 8B are diagrams illustrating examples of speech recognition methods with provision of dialect data to a parameter generation model implemented in cooperation with a speech recognition model.

Figure 1:
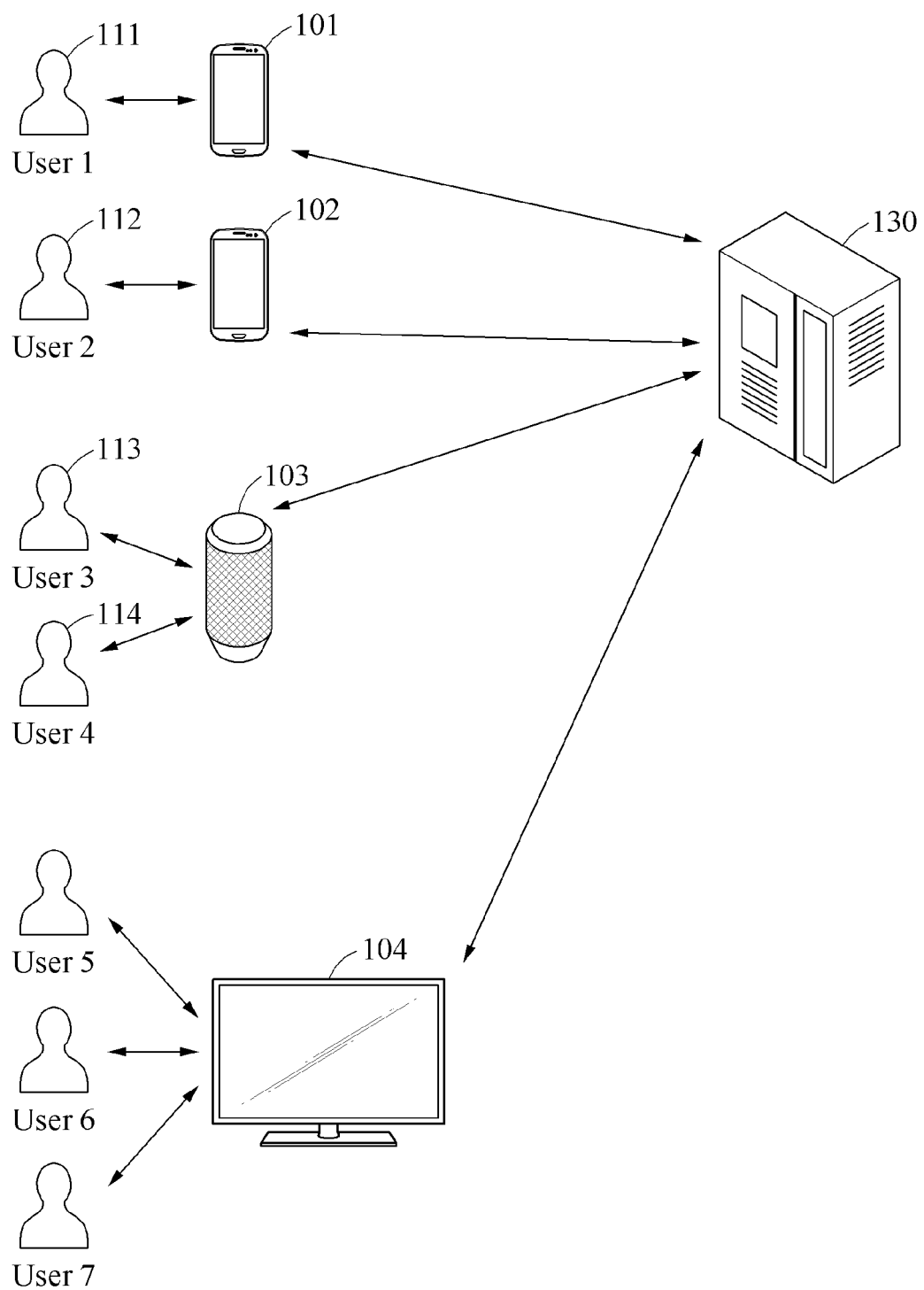
FIG. 1 is a diagram illustrating an example of a speech recognition system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

FIG. 1 is a diagram illustrating an example of a speech recognition system. In an example, the speech recognition system may be an individualized system for speech recognition, or selectively provide such individualized speech recognition.

Referring to FIG. 1, a speech recognition system may include any of one or more speech recognition apparatuses, one or more speech recognition servers 130, or one or more speech recognition apparatuses and one or more speech recognition servers 130.

One or more of the speech recognition apparatuses may be configured to collect sound or voice using one or microphones, for example, of a speech recognition apparatus and generate a corresponding analog sound signal, and configured to obtain therefrom a corresponding digital audio signal, e.g., through an analog to digital conversion and parsing of the sound signal. For example, the speech recognition apparatus may collect a speech sound uttered by a human being as a sound of multiple nearby sounds, and distinguish a voice or speech uttered by a user of the speech recognition apparatus from other nearby sounds. In the generation of the digital audio signal, e.g., for the collected speech, the speech recognition apparatus may be configured to organize the audio information into sequenced audio information or frames, as well as sequenced speech information, such as in units of morpheme, phoneme, word, and/or sentence.

For example, the speech recognition apparatus may be an electronic device that may be possessed or operated by an individual user. In such an example, as well as other examples, the speech recognition apparatus may be, for example, a smartphone, a smart pad, a wearable device such as a smart band, a personal digital assistant (PDA), a laptop, and the like. These examples may also be examples of a speech recognition apparatus that is an electronic device shared by a plurality of users. Thus, in addition to these examples, the speech recognition apparatus may be, for example, a speech recognition speaker 103 and a speech recognition television (TV) 104 as illustrated in FIG. 1. Here, though the speech recognition speaker 103 or TV 104 are indicated as each being used or shared by a plurality of users, and the smartphone, smart pad, wearable device, PDA, and laptop may each be indicated as being possessed or operated by a single user or individual, the speech recognition speaker 103 or TV 104 may also be possessed or operated by a single or individual user, and the smartphone, smart pad, wearable device, PDA, and laptop may each be used or shared by a plurality of users. The use of the term 'may' herein with respect to an example or embodiment, e.g., as to what an example or embodiment may include or implement, means that at least one example or embodiment exists where such a feature is included or implemented while all examples and embodiments are not limited thereto.

Thus, the speech recognition system may perform voice or speech recognition to recognize a voice or speech of one or more users. The speech recognition may refer to a machine process of distinguishing a voice of a user included in an audio signal, and converting the voice to a speech expressed in a language. For example, the speech recognition may convert collected audible speech of the user into a text form that may be reflected back to the user, used to control speech recognition system to perform one or more operations based on the recognized speech, or provided to (or within) applications the speech recognition system is configured to execute.

In an example, the speech recognition apparatus and/or the speech recognition server 130 may recognize an audio signal and generate text data corresponding to the audio signal. The term "audio signal" used herein may also be referred to as a "speech signal." For example, the speech recognition server 130 may receive a speech signal of a user from a speech recognition apparatus, e.g., as either analog or digital waveforms, and generate text data corresponding to the speech signal based on the received speech signal by performing speech recognition described herein. The speech recognition server 130 may transmit, to the speech recognition apparatus, the resultant text data generated by the converting of the speech signal, which as noted above may be used for various services to be provided to the user of the speech recognition apparatus.

In an example, the first terminal 101 is an individualized electronic device of a first user 111, and the second terminal 102 is an individualized electronic device of a second user 112. As a non-limiting example, the first terminal 101 and the second terminal 102 may be smartphones. In this example, the first terminal 101 may collect, from the first user 111, a speech signal representing a captured speech instruction to make a call to the second user 112, and transmit or otherwise forward the speech signal to the speech recognition server 130. The speech recognition server 130 may then receive the speech signal, and may perform speech recognition on the received speech signal to thereby obtain text data corresponding to the instruction from the speech signal. The speech recognition server 130 may then transmit or otherwise forward the obtained text data to the first terminal 101. When the text data is received by the first terminal 101, the first terminal 101 may analyze the received text data, recognize the represented instruction to call the second user 112, and execute a call application and control the call application to make a call to the second user 112.

In another example, where the analysis of the received text data by a speech recognition apparatus, e.g., by the first terminal 101, results in a determination that the recognized speech signal includes one or more other instructions, e.g., other than to make the example call, the speech recognition apparatus may determine that the text data recognized by the speech recognition server 130 includes a scheduling instruction to generate a schedule for the user of the speech recognition apparatus and proceed to generate the schedule or scheduling event, includes an Internet search query instruction for retrieving data of a web service and proceed to issue the query and retrieve the data, includes an instruction for content and/or recipient of a text message and proceed to draft and/or send the text message, or includes an instruction for implementing a retrieval or access of information stored in the speech recognition apparatus and proceed to retrieve and provide the retrieved data stored in the speech recognition apparatus to the user of the speech recognition apparatus.

However, operations of the speech recognition apparatus and the speech recognition server 130 are not limited to what is described in the foregoing. The speech recognition apparatus may collect a speech signal, and itself perform speech recognition of the collected speech signal to recognize the speech signal, and proceed to analyze the recognized speech, e.g., for recognizing any of such example instructions or queries, and perform any further operations based on a result of the analysis. In addition, though the above example discusses that the speech recognition server 130 transmits or forwards the recognized text data to the first terminal 101, the speech recognition server 130 may transmit or forward the recognized text data to the first terminal 101 and one or more of the example other terminals 102, 103, and/or 104 or any or all of such other terminals without transmitting or forwarding the text data to the first terminal 101. The speech recognition server 130 may further analyze the text data and perform operations based on the same, e.g., alternatively or in addition to transmitting or forwarding the text data. Any of the speech recognition server 103 and the various example speech recognition apparatuses may each be configured to perform speech recognition of collected speech information. In addition, while a common speech recognition model may be implemented by any of such devices, the respective devices may further or alternatively store and selectively implement additional speech recognition models that may be individualized according to dialect, for example, where a respective additional speech recognition model was trained specifically for a particular dialect, compared to another additional speech recognition model that was trained specifically for a different particular dialect.

Still further, as discussed below, for each of one or more languages, any of such devices may alternatively or still further store a speech recognition model, e.g., a based or common or multi-dialect trained speech recognition model training, and selectively modify the speech recognition model based on dialect parameters that are optimized for a particular dialect or recognized dialect of a corresponding language and then perform recognition of a speech signal using the modified speech recognition model. Thus, in such an example, while the speech recognition server 130 may have greater resources for storing multiple speech recognition models, e.g., each trained for a different dialect, the example speech recognition apparatuses may have less resources, or the dialect of the particular user of the speech recognition apparatus may not correspond identically to the dialects the existing speech recognition models are respectively trained for, and thus speech recognition may still be performed with such greater dialect accuracy by the speech recognition apparatuses using a base or common speech recognition model and then selectively modifying that base or common speech recognition model by the speech recognition apparatus for the dialect of the speaker of the speech recognition apparatus, without having to store all of the different dialect trained speech recognition models, in an example.

FIG. 2 is a diagram illustrating an example of a speech recognition model.

Referring to FIG. 2, any of the speech recognition systems and speech recognition apparatus described above with reference to FIG. 1 may use a speech recognition model 220. The speech recognition model 220 may be configured to perform machine recognition of a speech signal to generate text data, as a recognition of the speech signal. As noted above, the speech signal may refer to an analog wave form, that is then converted into digital waveform, and in some examples, then converted into feature data for the digital waveform prior to being acted on or applied/provided to the speech recognition model 220, or may refer to such feature data in the example speech sequence format that is acted on or applied/provided to the speech recognition model 220. Thus, for ease of description and not to limit examples thereto, hereinafter for this disclosure the speech signal term may be discussed as corresponding to such post-collection processing having been performed on captured audio to ultimately generate the example feature data in the example speech sequence form, for application/provision/input to the speech recognition model, i.e., in the form the speech recognition model expects such application/provision/input of information. As noted above, the speech recognition apparatus may perform all such post-collection processing of the captured speech and itself implement the speech recognition model 220, or the speech recognition apparatus may perform none, some, or all such post-collection processing of the captured speech, while the speech recognition server may then perform any remaining post-collection processing for the captured speech to generate corresponding speech information in the form expected by the speech recognition model 220, and implement the speech recognition model 220. The speech recognition model 220 may include an acoustic model and a language model, as non-limiting examples. Hereinafter, an example of how the speech recognition model 220 is stored and is implemented to generate text data as a machine recognition of a speech signal will be described. For example, as discussed above with respect to FIG. 1, one example may include a speech recognition apparatus generating a speech signal, e.g., for captured speech, and transmitting the speech signal to the speech recognition server, where the speech recognition server may perform speech recognition using received information. Thus, while examples are not limited to the speech recognition model 220 being implemented by the speech recognition server, e.g., as the speech recognition apparatus may autonomously store the speech recognition model 220 and itself implement the speech recognition model 220 to recognize a speech of a user, the below discussion with respect to FIG. 2 and the storing and implementing of the speech recognition model 220 will be discussed using the speech recognition server example.

The acoustic model may be a trained model thereby configured to recognize a speech signal by a unit of phoneme, for example, from features (e.g., the speech signal) extracted from the captured speech provided to the acoustic model. For example, the speech recognition system may estimate words indicated by the speech signal based on a result of recognizing the speech signal obtained by the acoustic model by a unit of phoneme.

The language model may be a trained model thereby configured to obtain probabilistic information associated with the connection of words in a sequence of speech. For example, the language model may provide probabilistic information associated with a probability of a next word, e.g., from among various potential or candidate next words, being connected to a current word input to the language model. For example, in a case in which a word "this" is input to the language model, the language model may provide probabilistic information associated with the respective probabilities of a word "is" or a word "was" being connected to the word "this." In an example, the speech recognition system may select a connection of words with top probabilities based on the probabilistic information generated by the language model, and output a result of the selecting as a speech recognition result. In an example, each of the acoustic model and the language model may be trained, such as through respective deep learning, and/or collectively trained through other or further deep leaning, using respective training data.

Hereinafter, for simplicity of description, operations associated with the acoustic model of the speech recognition model 220 will be mainly described. Examples include the acoustic model being embodied in any of various non-limiting architectures, such as, for example, a Gaussian mixture model (GMM), a deep neural network (DNN), and a bidirectional long short-term memory (BLSTM). However, an architecture for machine learning by which the acoustic model is embodied is not limited to the examples described in the foregoing, and the acoustic model may thus be embodied in a combined architecture of at least one of the examples. A neural network may be a recognition model embodied by hardware or a combination of hardware and stored parameter information configured to, when the speech recognition model 220 is implemented, perform a complex calculation using numerous artificial nodes, e.g., activation nodes. The neural network may be trained (e.g., through deep learning) through the artificial nodes, such that the trained neural network may then perform recognition through the artificial nodes.

In an example, the neural network may include a plurality of layers. For example, the neural network may include one or more input layers, at least one hidden layer 221, and one or more output layers. An input layer may receive, e.g., obtain, input data and transmit the received input data to one or more of the hidden layers 221, and an output layer may generate output data based on signals or other activation information received from nodes of one or more of the hidden layers 221. Also, though FIG. 2 demonstrates a single series of hidden layers 221, there may be one or more parallel arrangements of hidden layers 221, e.g., prior to respective nodes of respective final hidden layers 221 providing their outputs or activations to an output layer, as a non-limiting example.

Thus, in an example, the hidden layer 221 may be connected to the input layer and the output layer by being provided there between as illustrated, such that the speech recognition system may transform input data (input to the input layer of the speech recognition model 220) into values at the output layer indicative of the recognition result generated through the hidden layers 221 and the output layer. Nodes included in the input layer and a first or initial hidden layer 221 may be connected thereto through connection lines, each having or representing a trained connection weight, nodes included in the first or initial hidden layer 221 and a hierarchically next hidden layer 221 may be connected thereto through further connection lines, each having a trained connection weight, through an example of nodes included in the hierarchically final hidden layer 221 and the output layer being connected thereto through corresponding connection lines, each having or representing a trained connection weight, for example. Each node of the hidden layers 221 and the output layer, for example, may perform respective activation functions on the resultant weighted activations input to corresponding nodes, i.e., from input or activations from nodes of the hierarchically previous layer weighed according to corresponding trained connection weights. A type of neural network including a plurality of hidden layers is referred to as a DNN, and the learning or training the DNN is referred to as deep learning. The training will include training such connection weights until the neural network operates until a predetermined success or accuracy rate threshold or minimum error rate threshold are reached, for example, based on iterative implementations of the in-training neural network with adjusted connections weights. Among the nodes of the neural network, a node included in the hidden layer 221 is referred to as a hidden node 229.

As noted, the input layer, the hidden layer 221, and the output layer may include a plurality of nodes. The hidden layers 221 may include one or more layers that respectively operate as convolution filters and may include two or more fully-connected layers, when the speech recognition model 220 includes a convolutional neural network (CNN), may include one or more layers that otherwise perform filters, and/or may include one or more layers of various types respectively grouped by a certain function or characteristic, as non-limiting examples.

The example neural network, e.g., configured as an acoustic model, may be architecturally configured as or including, for example, a recurrent neural network (RNN). The RNN refers to a network in which an output value of one hidden layer 221 of a previous frame or tine is input again to the same hidden layer 221 of a current frame or time, and repeated for every further frame or time. These connections to the same hidden layer 221 or the same nodes of the same hidden layer 221 may also be referred to as recurrent connections, which may be similarly weighted connections dependent on trained connection weights. Thus, in an RNN, previous outputs may affect a result of calculating a new output.

In an example, the speech recognition system may divide a speech sequence 201 into a plurality of frames, and predict, estimate, or recognize an utterance corresponding to each of the frames using the speech recognition model 220. The speech recognition system may perform speech recognition using the acoustic model and/or the language model, and the acoustic model and/or the language model may respectively include such an input layer, hidden layers 221, and output layer. The output layer may output a result 230 as a predicting or estimating of the utterance corresponding to a frame 210 input to the input layer. For example, the speech recognition apparatus or the speech recognition server may input outputs of previous hidden nodes included in a previous hidden layer to each of the hidden layer 221 through connection lines having or representing respective connection weights, and generate an output of the hidden node 229 included in the hidden layer 221 based on values to which the respective connection weight are applied to the outputs of the previous hidden nodes and on an activation function of the hidden node 229. In a non-limiting example where the processor of the speech recognition apparatus configured to implement the speech recognition model 220 is a neuromorphic processor, the processor may fire an output from a current hidden node to a subsequent hidden node when a result of the activation of the current hidden node is greater, or accumulates to be greater, than a threshold of the current hidden node. In this example, the current hidden node remains in an inactivated state, instead of transmitting a signal to the subsequent node, until the current hidden node reaches a threshold activation strength, e.g., using input vectors. Training of the speech recognition model 220 by a speech recognition apparatus may similarly implement such a neuromorphic processor, or other processor, as discussed above.

In an example, the output layer may be a softmax layer, which, for example, may include nodes. As a non-limiting example, the number of the nodes may be equal to the total number of all potential or trained utterances, where each of the nodes of the output layer may be probabilistic data that respectively indicates a probability of the input frame 210 being a certain utterance.

Figure 3:
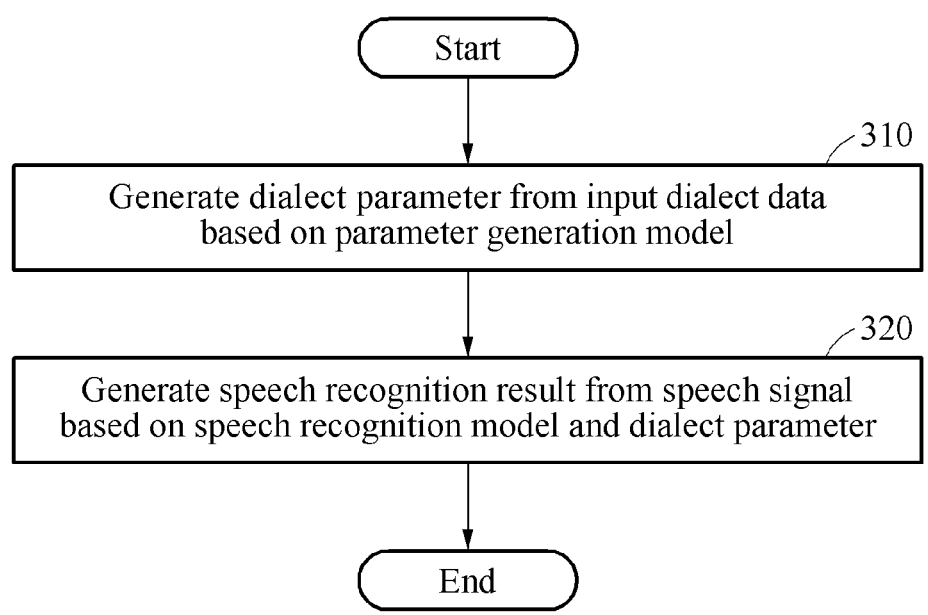
FIG. 3 is a flowchart illustrating an example of a speech recognition method.

FIG. 3 is a flowchart illustrating an example of a speech recognition method.

Referring to FIG. 3, in operation 310, a speech recognition apparatus generates dialect parameters from input dialect data based on a parameter generation model. The input dialect data may be data input to the parameter generation model. The input dialect data may include data associated with a dialect, and may indicate a dialect group to which a user belongs, for example. For example, the input dialect data may be data indicating one dialect group to which a language of the user belongs among a plurality of dialect groups of the language. In another example, the input dialect data may be probabilistic data indicating respective probabilities of the dialect group of the language of the user, e.g., where a highest probability indication may represent that the corresponding dialect group is the most probably dialect group to which the user belongs. However, the input dialect data is not limited to the examples described in the foregoing.

A dialect grouping may be used herein to classify, into groups, dialects of a same language which differ from region, race, culture, and the like. For example, in a case of the language being English, the dialect groups may include, for example, a native English group, an American English group, a British English group, a Filipino English group, an Indian English group, a Korean English group, a western American English group, a mid-American English group, an eastern American English group, and the like. However, examples of dialect group are not limited to the examples described in the foregoing, and the dialects groups may be classified based on a dialect characteristic in each of multiple languages.

The dialect parameter refers to parameters generated by the parameter generation model. The dialect parameter may be an abstract parameter representing a linguistic characteristic of a dialect, that may be applied to a multiple dialect trained speech recognition model, e.g., to thereby modulate or scale an input and/or an output of at least one of layers of the speech recognition model with respect to the dialect. The generated abstract dialect parameter may have various forms and dimensions, such as having a scaling matrix form and/or a batch parameter form. In the scaling matrix example, respective parameters may be scaling values for respective nodes of a layer, e.g., after the activation operation of the respective nodes, such as, for example, learning hidden unit contributions (LHUC). The dimension of the scaling matrix may be m×1, such that the abstracted parameter could be a vector format, or the scaling matrix may be an m×n, such that the abstracted parameter could be a matrix form. The generated abstract dialect parameters may have additional dimensions and thus alternate forms. In the batch parameter example, each of plural respective dialect parameters may include a batch normalization parameter, for example, γ and β. Same or different abstract dialect parameter formats may be generated, e.g., by one or more such implemented parameter generation models, with respect to application to one or more or all different layers.

The parameter generation model used herein refers to a model configured, e.g., trained, to output the dialect parameter(s) from or based on the input dialect data and may be, for example, a neural network. The parameter generation model may include a plurality of layers. The parameter generation model and the speech recognition model may be connected to each other such that an output, or respective outputs, of the parameter generation model is applied to one or more of the layers of the speech recognition model.

In operation 320, the speech recognition apparatus generates a speech recognition result from a speech signal based on the speech recognition model and dialect parameters generated by the parameter generation model. For example, the speech recognition apparatus may apply the dialect parameters determined by the parameter generation model respectively to at least a portion of the layers of the speech recognition model while the speech recognition model is performing speech recognition of/for the speech signal. In an example, this application of the dialect parameters by the speech recognition apparatus may thus dynamically modify the speech recognition model depending on the dialect(s) being spoken.

For example, in a case of the dialect parameter being a batch normalization parameter (hereinafter simply referred to as a batch parameter), the speech recognition apparatus may apply the batch parameter to the data that is to be input to each node of at least one layer of the speech recognition model. The speech recognition apparatus may thus modify a node input, for example, a normalized input, of a hidden layer of the speech recognition model using the batch parameter, and generate a new node input of the hidden layer. For example, the speech recognition apparatus may generate the new node input by multiplying the normalized input by a first batch parameter γ and adding a second batch parameter β. The speech recognition apparatus may then input the respective new node inputs to the corresponding nodes of the hidden layer to respectively calculate their activation outputs, e.g., including an application of an activation function with respect to one or more inputs to a node, of the hidden layer. In this example, a batch normalization layer may be connected before a hidden layer. For example, a batch normalization layer connected before a hidden layer may be provided a batch parameter used to change an input to be provided to each node of the hidden layer, e.g., based on the example first batch parameter γ and second batch parameter β. In an example, an output layer of the parameter generation model may also be such a batch normalization layer, and the batch normalization layer may be inserted into the speech recognition model to generate respective batch normalized input data to one or more of the hidden layers. In another example, such an output layer of the parameter generation model (or a batch normalization layer subsequent to the output layer) may be input the input data output from a previous hidden layer, for input to a subsequent hidden layer, and perform the batch normalization of the input data based on the batch parameter determined by the parameter generation model.

In an example, the same number of batch normalization layers as the number of hidden layers of the speech recognition model may be included, e.g., within the speech recognition model or as respective output layers (or subsequent to the output layers) of the parameter generation model, such that respective outputs of each of the batch normalization layers is connected to a corresponding hidden layer. However, examples are not limited to the example described in the foregoing, and respective batch normalization layers may be connected to only some of the hidden layers. Thus, batch normalization by a batch normalization layer may dynamically vary based on what example batch parameter, or other dialect parameters, is output by the parameter generation model.

In addition, applications of the dialect parameter are not limited to what is described in the foregoing, as other examples are also available. For example, in a case of the parameter generation model determined dialect parameter being a scale matrix, the speech recognition apparatus may apply the determined scale matrix to an output of at least one hidden layer of the speech recognition model through an elementwise operation, for example, a matrix product calculation. The speech recognition apparatus may also apply the scale matrix by applying to each of the hidden layers a corresponding scale matrix respectively determined for each of the hidden layers by the parameter generation model. However, examples are not limited to the example described in the foregoing, as in another example the speech recognition apparatus may determine a respective scale matrix only for some of the layers of the speech recognition models.

The speech recognition apparatus may generate the speech recognition result from the speech signal based on the modified speech recognition model, e.g., the speech recognition model as modified by applying a dialect parameter, or respective dialect parameters, prior to and/or after one or more hidden layers of the speech recognition model with respect to data input to such hidden layers and/or data output by such hidden layers. The speech recognition apparatus may obtain normalized data by normalizing the speech signal, and generate the speech recognition result from the normalized data based on the modified speech recognition model, i.e., the speech recognition model to which the dialect parameter is applied. For example, the speech recognition apparatus may calculate a result of recognizing the speech signal by a unit of phoneme based on the speech recognition model to which the dialect parameter is applied. Alternatively, or additionally, the speech recognition apparatus may be configured to implement the modification of the speech recognition model by modifying predetermined parameters, e.g., connection weights, of the speech recognition model based on the generated dialect parameters, as discussed further below.

In an example, the parameter generation model and the speech recognition model may be trained together. The training of the parameter generation model and the speech recognition model will be described in greater detail below with reference to FIGS. 11 and 12.

Figure 4:
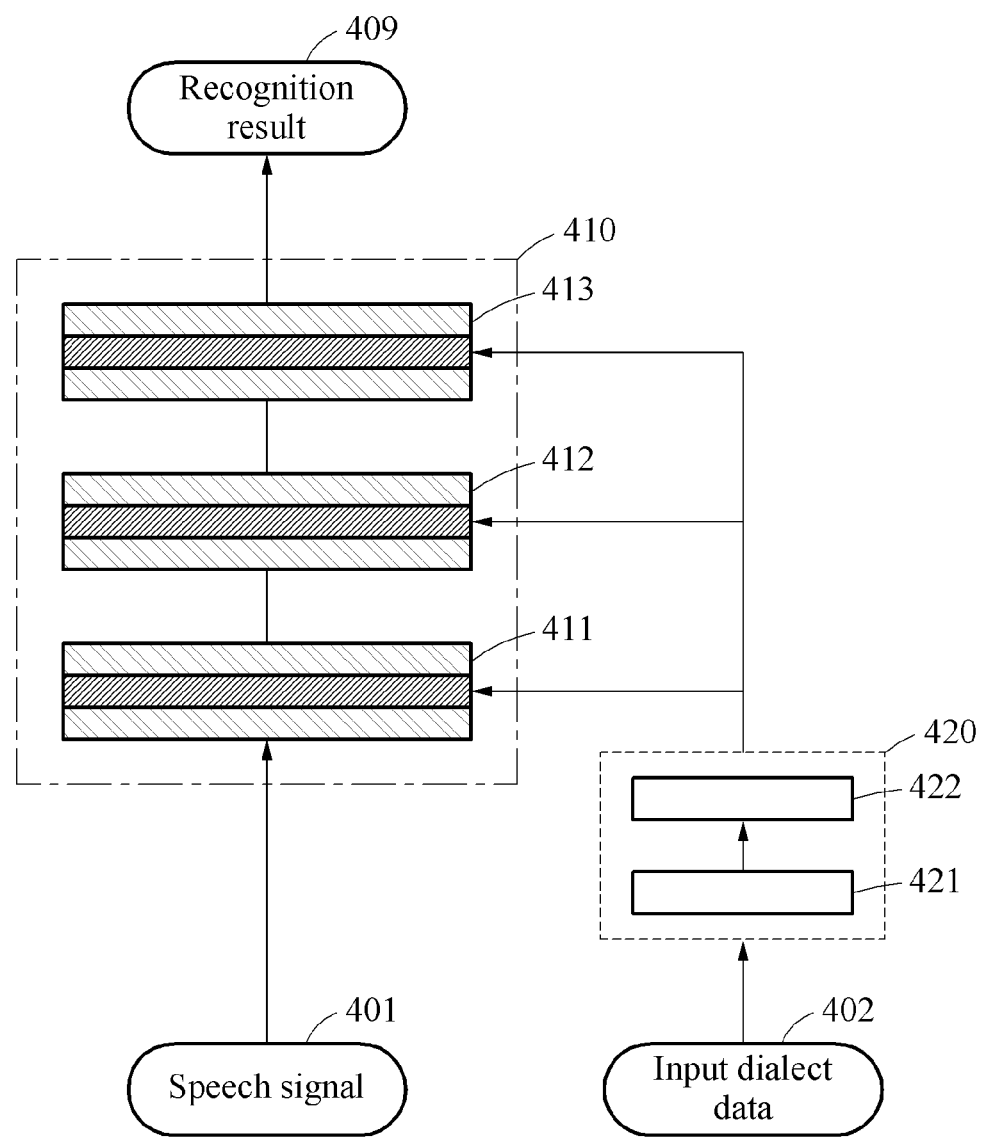
FIG. 4 is a diagram illustrating an example of a speech recognition model and a parameter generation model.

FIG. 4 is a diagram illustrating an example of a speech recognition model and a parameter generation model.

Referring to FIG. 4, a speech recognition model 410 includes a plurality of layers 411, 412, and 413. The layers 411, 412, and 413 may each be provided in an architecture of a long short-term memory (LSTM), but are not limited thereto. The speech recognition model 410 may be configured to output a recognition result 409 from a speech signal 401. A parameter generation model 420 includes a plurality of layers 421 and 422. The parameter generation model 420 may be configured to output dialect parameters from input dialect data 402. In the example illustrated in FIG. 4, outputs of an output layer of the parameter generation model 420 may be respectively applied to the inputs to, or outputs from, each of the layers 411, 412, and 413 of the speech recognition model 410. The speech recognition model 410 and the parameter generation model 420 may be the same as the speech recognition model and parameter generation model of FIG. 3, noting that examples are not limited thereto.

In an example, a speech recognition apparatus determines the input dialect data 402 based on a user input received from a user. In response to the user input being received from the user, the speech recognition apparatus may determine dialect information indicated by the user input to be the input dialect data 402. The dialect information refers to information indicating a dialect group that has been determined or set, e.g., from among plural dialect groups, for the user input.

The speech recognition apparatus variably modifies the speech recognition model 410 by variably applying, to the speech recognition model 410, different dialect parameters determined from the parameter generation model 420. For example, the speech recognition apparatus determines the recognition result 409 from the speech signal 401 using one such modified speech recognition model 410 based on a determined dialect parameter.

Each layer of the speech recognition model 410 may include, or may be modified or tuned by, respective dialect parameters that may dynamically change with respect to different dialects or dialect groups, compared to common parameters that may result from previous training with respect to features or characteristics of a language including multiple dialects. The dialect parameters may, thus, be dynamically generated or set based on a dialect of the speech considered by the speech recognition apparatus. As noted, the common parameters may be respective parameters trained with a speech corresponding to a plurality of dialect groups, and thus may at least be trained for features or characteristics commonly shared by the plurality of dialect groups, as a non-limiting example. Although it is illustrated in the example of FIG. 4 that the respective dialect parameters are applied with respect to nodes or connections in a middle of each layer, while the respective common parameters are maintained in the remaining portions of each layer, examples are not limited to the illustrated example. For example, respective dialect parameters may be applied to nodes at an input and/or output side of each layer. In these examples, the illustrated individual layers of FIG. 4 each are representative of a plurality of layers of nodes and connections there between. Thus, the application of dialect parameters to a middle of an illustrated layer corresponds to a corresponding dynamically set connection weight applied to an activation value from an internal layer of the illustrated layer, and the application of dialect parameters to an input side of an illustrated layer corresponds to a corresponding dynamically set connection weight applied to an activation value from a previous illustrated layer of the speech recognition model. In addition, in an example, an only common parameter implementation of the speech recognition model may reflect dialect dependency the closer a hidden layer is to the example recognition result 409, and thus, while dialect parameters may be applied to an uppermost hidden layer in an example, in the same example dialect parameters may not be applied to a lowest layer or may not be applied for all lower layers up to an upper or the uppermost layer. For example, in an example, respective dialect parameters may be only applied to layer 413 and not applied to layers 412 and 411, or only applied to layers 413 and 412 and not applied to layer 411.

Although it is described herein that the speech recognition model 410 includes layers in a neural network implementation, examples are not limited thereto.

Figure 5:
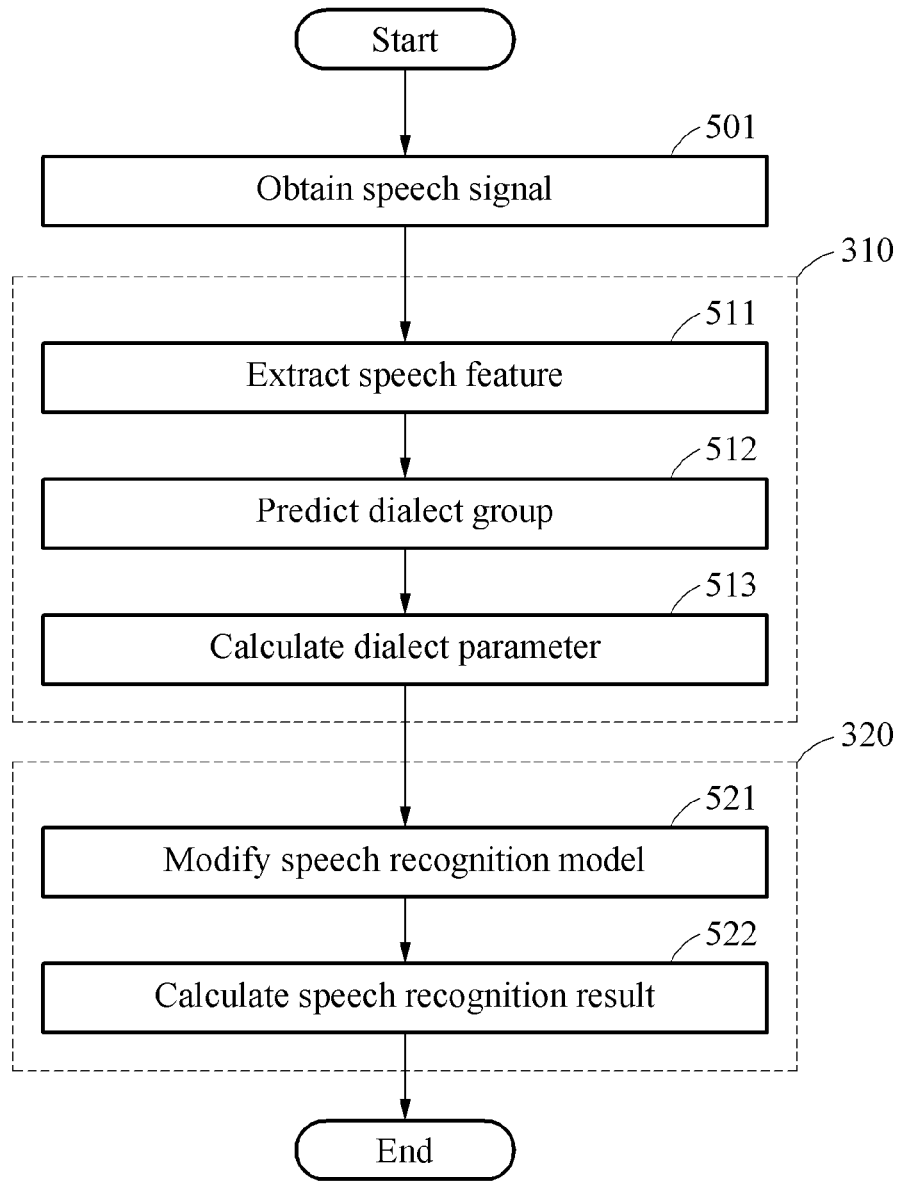
FIG. 5 is a flowchart illustrating an example of a speech recognition method.

FIG. 5 is a flowchart illustrating another example of a speech recognition method.

Referring to FIG. 5, in operation 501, a speech recognition apparatus obtains a speech signal. For example, the speech recognition apparatus may obtain the speech signal through a microphone of the speech recognition apparatus or connected, wired or wirelessly, to the speech recognition apparatus.

In an example, the speech recognition apparatus may calculate input dialect data from the speech signal using a dialect classification model. The dialect classification model may be configured, e.g., trained, to output input dialect data from the speech signal.

For example, in operation 511, the speech recognition apparatus extracts a speech feature using the dialect classification model. For example, the speech recognition apparatus may extract the speech feature from the speech signal using at least a portion of layers of the dialect classification model, e.g., one or more first layers of the dialect classification layer.

In operation 512, the speech recognition apparatus predicts a dialect group. For example, the speech recognition apparatus may predict the input dialect data from the speech feature using the remaining subsequent portion of the layers of the dialect classification model. In the example illustrated in FIG. 5, the input dialect data may be data indicating a dialect group to which the speech signal belongs among a plurality of dialect groups. However, examples are not limited to the illustrated example.

In an example, the speech recognition apparatus may calculate and output, as the input dialect data, probability or probabilistic data associated with the dialect to which the speech signal is determined, using the dialect classification model, to belong from the speech signal. For example, when a speech signal is obtained from a user, the speech recognition apparatus may generate input dialect data indicating a dialect characteristic or feature of the obtained speech signal. In this example, the generated input dialect data may be data indicating a dialect feature intrinsic to an individual user. In a case in which the input dialect data is the probability or probabilistic data as described above, the input dialect data may indicate the respective probabilities of the speech of a user belonging or having characteristics corresponding to each of the dialect groups. For example, the language of the user may have a mixture of characteristics or features of multiple dialect groups, and such a probabilistic input dialect data may indicate a weight or percentage of each of the dialect groups reflected in the language of the user.

For example, in a case in which an American user used to reside in France and also the Philippines, the spoken language of the user may have characteristics of an American English dialect, a French English dialect, and a Filipino English dialect. As described, the input dialect data calculated based on the dialect classification model may thus have complex features in which a plurality of dialects in a language of a user are mixed.

In operation 513, based on the input dialect data (either as the data indicating a particular dialect group or as such probabilistic data for multiple groups), the speech recognition apparatus calculates dialect parameters. For example, the speech recognition apparatus may dynamically generate the dialect parameters from the input dialect data calculated in operation 512 using a parameter generation model. In an example, the speech recognition apparatus may dynamically generate the respective dialect parameters to be optimized for dialects, e.g., for each individual user, using the example probabilistic input dialect data. In this example, the speech recognition apparatus may calculate the respective dialect parameters from the input dialect data indicating a mixed feature of dialect groups of the language of a speaker. The dialect parameters may thus reflect abstract parameters corresponding to a complex dialect feature included in the language of a current speaker as determined by parameter generation model considering the weight or proportion of each dialect group occupying the language of the current speaker.

In operation 521, the speech recognition apparatus modifies the speech recognition model. For example, the speech recognition apparatus may apply, e.g., insert or set, replace, or adjust an original parameter set during training of the speech recognition model based on common language having multiple dialects, the generated dialect parameters to the speech recognition model to generate a new speech recognition model particular to the user. At least a portion of layers of the new speech recognition model, e.g., as an insertion and/or adjustment, may thus include a portion reflecting the dynamically generated dialect parameters. Here, the application of the dialect parameters to the speech recognition model to generate the new speech recognition model may also be considered a tuning of the speech recognition model for a particular dialect or dialect classifications, as non-limiting examples.

In operation 522, the speech recognition apparatus calculates a speech recognition result. For example, the speech recognition apparatus may calculate the speech recognition result from the speech signal obtained in operation 501 based on the new or tuned speech recognition model to which the dialect parameters have been applied. At least a portion of layers of the new speech recognition model to which the dialect parameters have been applied may include the aforementioned respective common parameter and include or reflect the respective dialect parameters.

As described above, the speech recognition apparatus may accurately recognize a speech from a speech signal, of a user having a complex dialect feature, using dialect parameters optimized for a dialect feature of the language of the captured speech of the user. In addition, the speech recognition apparatus may dynamically generate dialect parameters each time the speech recognition apparatus obtains a speech signal. Further, the speech recognition apparatus may dynamically generate dialect parameters optimized for a dialect(s) of a user even when the same user utters the speech in different tones.

Figure 6:
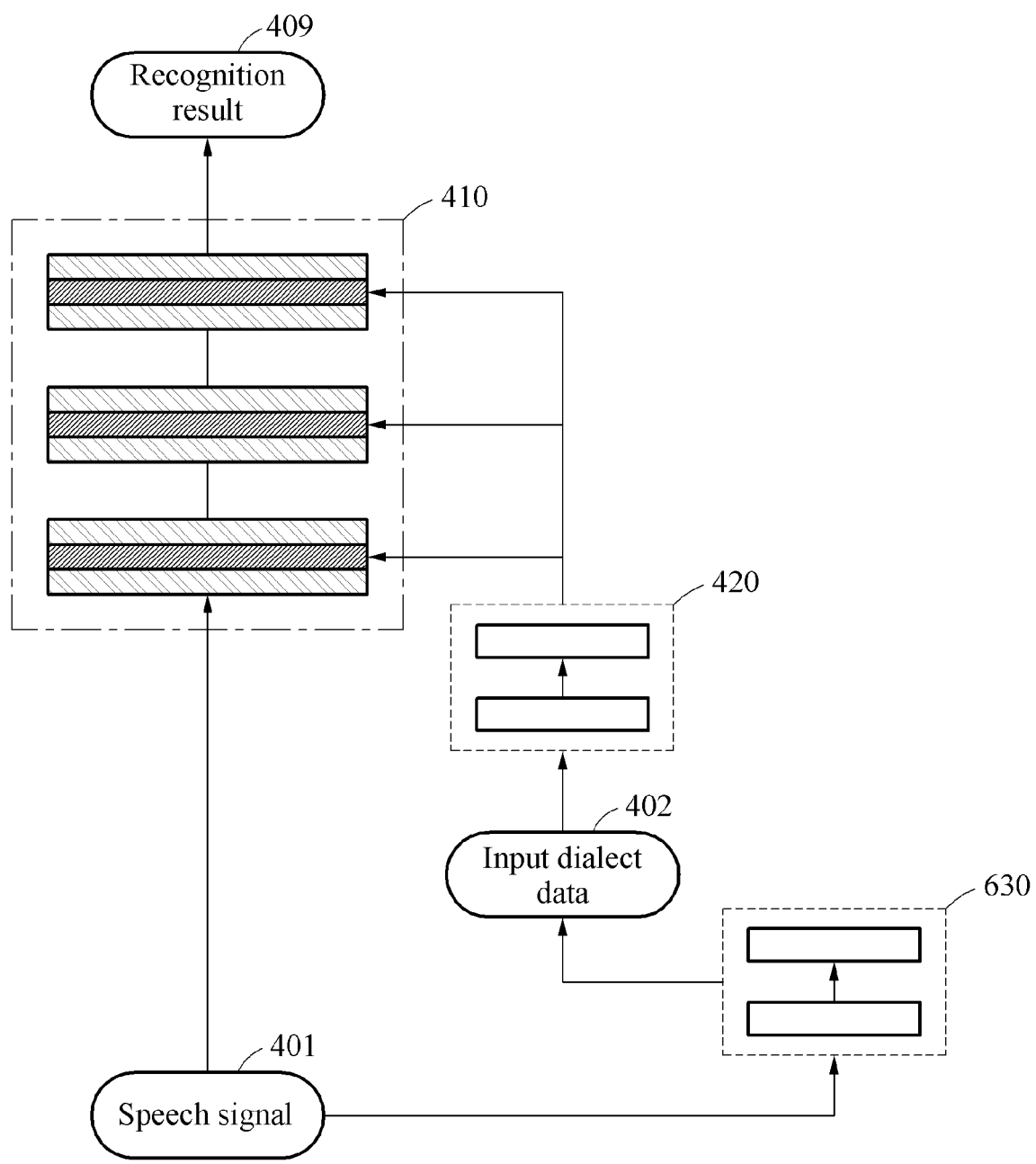
FIG. 6 is a diagram illustrating an example of a speech recognition model, a parameter generation model, and a dialect classification model.

FIG. 6 is a diagram illustrating an example of a speech recognition model, a parameter generation model, and a dialect classification model, e.g., configured to perform the speech recognition method of FIG. 5, though examples are not limited thereto.

As a non-limiting example, and referring to FIG. 6, a speech recognition model may include a plurality of layers, similarly to the example speech recognition model 410 described above with reference to FIG. 4. Below, explanations of FIGS. 6-8B will be made using same reference numerals for features having similar function as corresponding features of FIG. 4, and though the same reference numeral features in FIGS. 6-8B may each be the same corresponding feature in FIG. 4, e.g., in various examples, examples are not limited thereto. Accordingly, each of the layers of the speech recognition model 410 includes respective dialect parameters generated from a parameter generation model 420, in addition to existing common parameters. A speech recognition apparatus generates input dialect data 402, to be input to the parameter generation model 420, using a dialect classification model 630.

The dialect classification model 630 may be configured, e.g., trained, to output a dialect feature of a language of a user. For example, the dialect classification model 630 may be configured to output the input dialect data 402 from a speech signal 401. In this example, the input dialect data 402 may be, for example, data indicating a single dialect group among a plurality of dialect groups, e.g., based on a one-hot encoding method. For another example, the input dialect data 402 may be probability or probabilistic data indicating a weight or proportion of a feature of each dialect group occupying the language of the user, or probability of each group being the accurate dialect of the language of the user.

However, examples are not limited to the examples described in the forgoing, and the input dialect data 402 may also be an extracted speech feature. For example, the speech recognition apparatus may select or use an output of one or more layers of the dialect classification model 630 as the input dialect data 420 while the dialect classification model 630 calculates dialect information from the speech signal 401. An output of a layer of the dialect classification model 630 may be feature data indicating an abstract speech feature of the speech signal 401.

The speech recognition apparatus calculates dialect parameters from the input dialect data 402 using the parameter generation model 420. The speech recognition apparatus applies the calculated dialect parameters to the speech recognition model 410. The speech recognition apparatus generates a recognition result 409 from the speech signal 401 based on the speech recognition model 410 having been modified or tuned with or based on the generated dialect parameters, e.g., the recognition result 409 is a result of an implementation of the tuned speech recognition model.

Although it is illustrated in the example of FIG. 6 that the dialect classification model 630 outputs the input dialect data 402 based on or from the speech signal 401, examples are not limited to the illustrated example. For example, in lieu of the speech signal 401, the speech recognition apparatus may use feature data generated or calculated by a layer of the speech recognition model 410, and implement the dialect classification model 630 using the feature data to calculate or generate the input dialect data 402. The speech recognition apparatus may then generate dialect parameters from the input dialect data 402 using the parameter generation model 420.

Figure 8A:
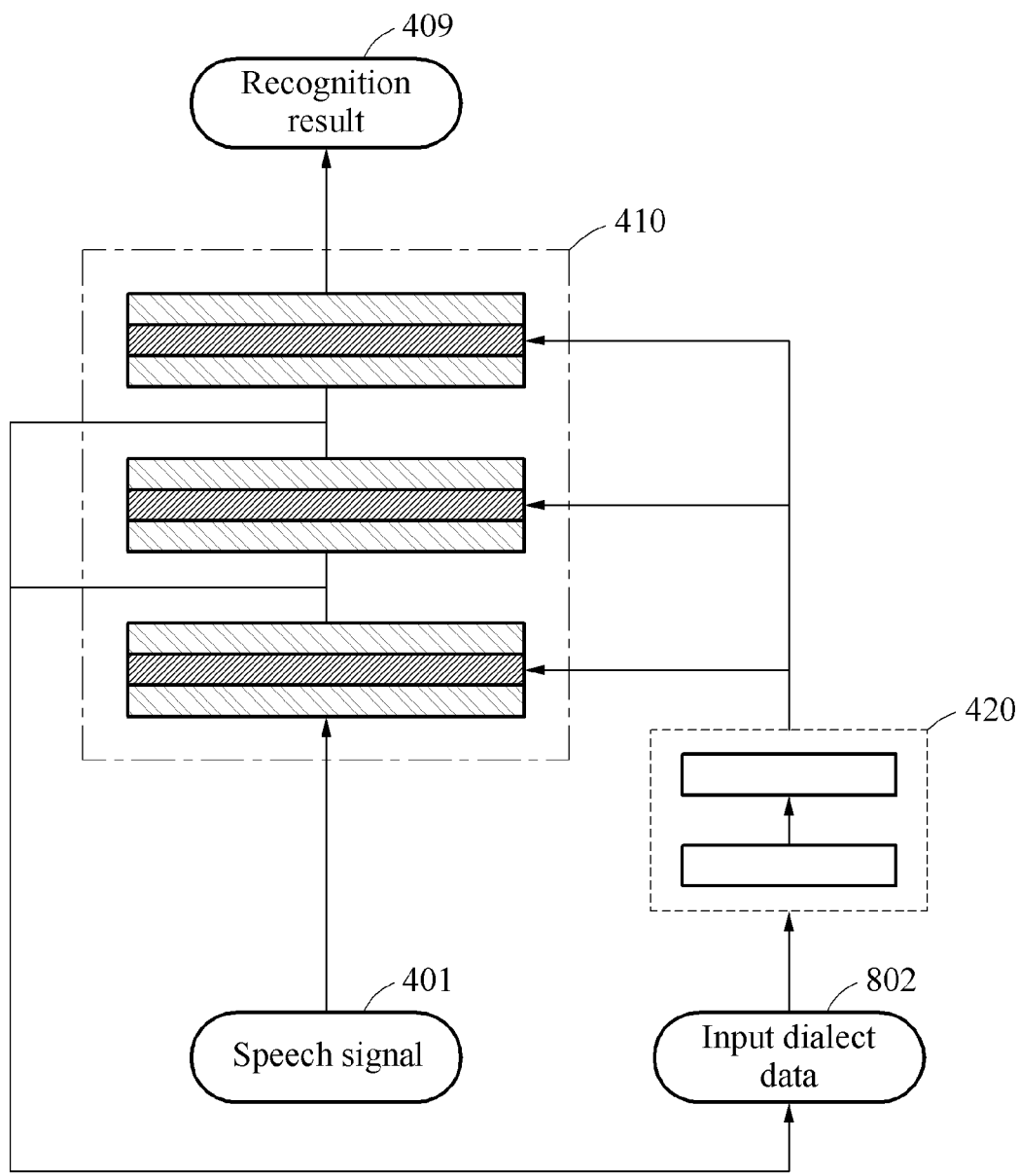
Figure 8B:
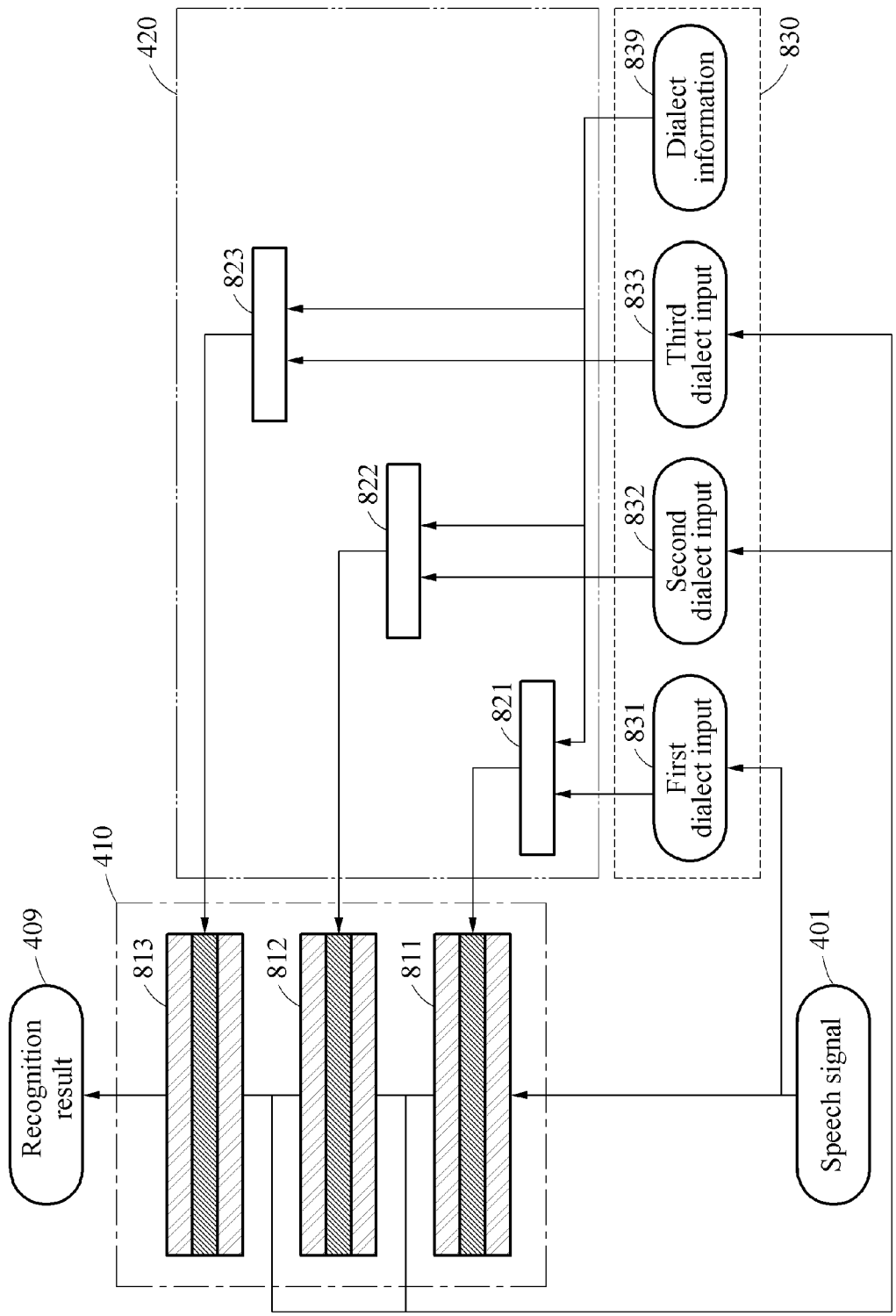

FIGS. 7, and 8A and 8B are diagrams illustrating examples of input dialect data provided to a parameter generation model.

Referring to FIG. 7, a parameter generation model 420 uses a speech signal 401 as input dialect data 702. A speech recognition apparatus generates dialect parameters from the speech signal 401 as the input dialect data 702 using the parameter generation model 420.

Referring to FIG. 8A, a parameter generation model 420 uses, as input dialect data 802, feature data output from at least a portion of layers of a speech recognition model 410, for example, a speech feature. A speech recognition apparatus generates dialect parameters by the parameter generation model 420 being provided the feature data output from the at least a portion of the layers of the speech recognition model 410.

Referring to FIG. 8B, a parameter generation model 420 uses, as input dialect data 830, a speech signal 401 and feature data output from each of plural layers of a speech recognition model 410. In an example, the speech recognition apparatus may generate dialect parameters for each of the layers of the speech recognition model 410 respectively using data input to a corresponding layer, for example, input dialect data, using the parameter generation model 420. The data input to the corresponding layer of the speech recognition model 410 may be feature data output from a previous layer, or a speech signal, of the speech recognition model 410.

For example, the parameter generation model 420 includes a plurality of parameter generation layers, for example, a first parameter generation layer 821, a second parameter generation layer 822, and a third parameter generation layer 823, respectively corresponding to the layers of the speech recognition model 410, for example, a first layer 811, a second layer 812, and a third layer 813, as illustrated. Each of the parameter generation layers 821, 822, and 823 may be connected to a corresponding layer of the speech recognition model 410, e.g., to receive feature data input to the corresponding layer of the speech recognition model 410 and to provide the respectively generated dialect parameters to the corresponding layer of the speech recognition model. Thus, each of the parameter generation layers 821, 822, and 823 is configured to generate such dialect parameters for a corresponding layer of the speech recognition model 410. As illustrated in FIG. 8B, the input dialect data 830 input to each of the parameter generation layers 821, 822, and 823 includes a first dialect input 831, a second dialect input 832, a third dialect input 833, and dialect information 839.

The speech recognition apparatus generates first dialect parameters from the first dialect input 831, for example the speech signal 401, based on the first parameter generation layer 821. The first dialect parameters output from the first parameter generation layer 821 are applied to the first layer 811 of the speech recognition model 410. The speech recognition apparatus generates second dialect parameters from the second dialect input 832, for example, feature data output from the first layer 811, based on the second parameter generation layer 822. The second dialect parameters output from the second parameter generation layer 822 are applied to the second layer 812 of the speech recognition model 410. The speech recognition apparatus generates third dialect parameters from the third dialect input 833, for example, feature data output from the second layer 812, based on the third parameter generation layer 823. The third dialect parameters output from the third parameter generation layer 823 are applied to the third layer 813 of the speech recognition model 410.

The speech recognition apparatus may also generate respective dialect parameters by also inputting the dialect information 839 along with a corresponding dialect input to each layer of the parameter generation model 420. The dialect information 839 may be, for example, a feature vector indicating a feature or characteristic of a dialect of a language of a user, e.g., a feature vector generated through a registration process with the user or generated and stored in a previous recognition of the user for the current subsequent application of the dialect information 839. For example, the feature vector may be generated from any of the feature extraction layers discussed herein that may be applied in such a registration, previous, or initial process. In the example of FIG. 8B, the speech recognition apparatus inputs the dialect information 839 along with the first dialect input 831 to the first parameter generation layer 821. The speech recognition apparatus inputs the dialect information 839 along with the second dialect input 832 to the second parameter generation layer 822. The speech recognition apparatus inputs the dialect information 839 along with the third dialect input 833 to the third parameter generation layer 823.

As described above, the speech recognition apparatus may modify the speech recognition model 410 to recognize a speech more accurately by applying dialect parameters generated from feature data output from a previous layer to each layer of the speech recognition model 410 based on the parameter generation model 420, as well as the aforementioned predetermined dialect information, for example.

The speech recognition apparatus may include, in the speech recognition model 410, as a non-limiting example, the dialect parameters generated as described above with reference to FIGS. 7, and 8A or 8B.

Figure 9:
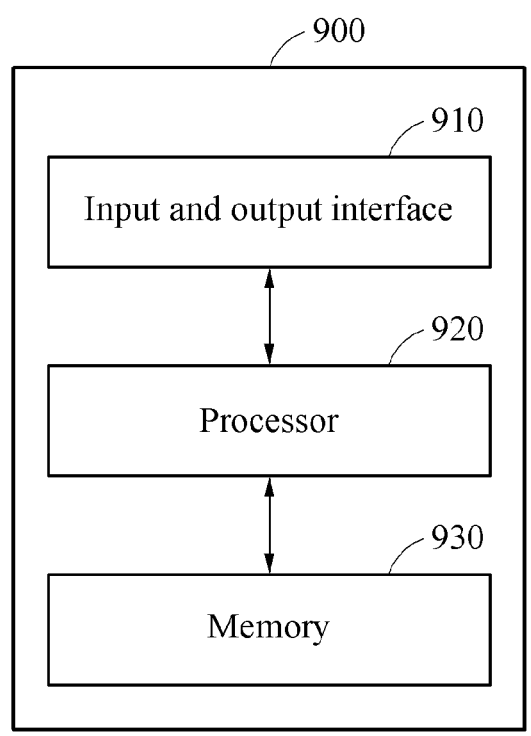
FIG. 9 is a diagram illustrating an example of a speech recognition apparatus.
Figure 10:
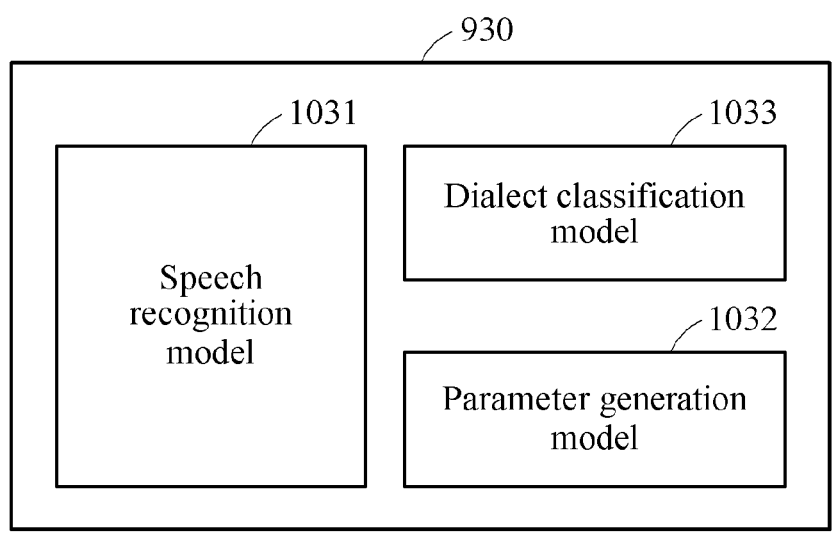
FIG. 10 is a diagram illustrating an example of a memory storing a speech recognition model, a parameter generation model, and a dialect classification model.

FIG. 9 is a diagram illustrating an example of a speech recognition apparatus. FIG. 10 is a diagram illustrating an example of a speech recognition model, a parameter generation model, and a dialect classification model stored in a memory.

Referring to FIG. 9, a speech recognition apparatus 900 may include an input and output interface 910, a processor 920, and a memory 930.

The input and output interface 910 may be configured to receive a speech of a user or a correct answer text as an input, and provide the user with a recognition result or a guide text. The input and output interface 910 may be representative of, for example, any one or any combination of a microphone to receive a speech of a user as an input, a keyboard, a touchscreen, a touchpad, and the like, such as to receive a correct answer text from a user among other functions of the speech recognition apparatus 900 the processor 920 is configured to implement. The input and output interface 910 may further be representative of, for example, a display to provide the recognition result or the guide text, as well as a speaker to audibly provide the recognition result or responses based on interpreted instructions in the recognized speech.

The processor 920 may generate dialect parameters from input dialect data using a parameter generation model 1032. The processor 920 may generate a speech recognition result from a speech signal based on a speech recognition model 1031 and applied the dialect parameters. However, operations of the processor 920 are not limited to what is described in the foregoing, and the processor 920 may perform any one, any combination, or all operations described above with reference to FIGS. 1 through 8B as well as below with respect to FIGS. 11 and 12.

The memory 930 may store instructions that may be executed by the processor 920, e.g., which when executed configure the processor to implement any one, any combination, or all operations described herein, and may store the parameter generation model 1032, a dialect classification model 1033, and the speech recognition model 1031. Each model may be a neural network-based speech recognition model. In a case of each model being a neural network, the memory 930 may store the respective parameters of the respective models, such as, for example, respective connection weights for each activation node of each layer of the neural network.

In an example, the speech recognition apparatus 900 may maintain previous dialect parameter(s) generated based on a previous input speech, e.g., by a previous user, until new input dialect data, e.g., of a current user, is received, i.e., the generation of new dialect parameters may be selectively performed dependent on dialect classification by a classifier provided the input speech or feature data of the input speech. Here, the classifier may correspond to the dialect classification model, but examples are not limited thereto. In addition, in response to a dialect group of the example current user being determined to differ from a dialect group of the example previous user, e.g., by such a dialect classifier, the speech recognition apparatus 900 may then select to generate new dialect parameters using the input dialect data of the current user, e.g., as output by the dialect classifier and/or as feature data input to a corresponding layer of the speech recognition model, and then apply the new dialect parameters to the speech recognition model or adjust the existing corresponding parameters of the speech recognition model based on the new dialect parameters.

It is described above with reference to FIGS. 1 through 10 that the speech recognition model 1031, the parameter generation model 1032, and the dialect classification model 1033 are trained models. The speech recognition apparatus 900 may additionally or alternatively train any one, any combination, or all these models, and may train together any two, any combination, or all models. For example, the speech recognition apparatus 900 may train the parameter generation model 1032 based on a training speech signal and input dialect data corresponding to the training speech signal. The speech recognition apparatus 900 may train the parameter generation model 1032 such that the parameter generation model 1032 outputs dialect parameters based on input dialect data from the training speech signal.

In an example, the speech recognition apparatus 900 may identify a language of a user and select the corresponding language speech recognition model 1031. For example, the speech recognition apparatus 900 may store multiple speech recognition models respectively for different spoken languages, with a speech recognition model corresponding to each of the languages being stored, and additionally store a corresponding parameter generation model and a corresponding dialect classification model corresponding to each of the multiple speech recognition models. The speech recognition apparatus 900 may thus apply generated dialect parameters to the selected speech recognition model 1031. The speech recognition apparatus 900 may generate the speech recognition result for the speech signal using the speech recognition model 1031 to which the generated dialect parameters are applied.

The speech recognition apparatus 900 may be representative of, or provided in, a personal device such as a smartphone and the like, and provide a speech recognition function that may be optimized for a pronunciation of a user. The speech recognition apparatus 900 may also be representative of, or provided in, any device implementing a speech recognition function, such as, for example, a home speaker, and may improve an overall performance of speech recognition.

The speech recognition apparatus 900 may accurately perform the speech recognition using an integral model in which the speech recognition model 1031 and the parameter generation model 1032 are integrated, without having to individually generate and manage an entire model for each dialect. Thus, costs to be used for server development and maintenance may be reduced. Further, the speech recognition apparatus 900 may also be applied to a speech recognition-based end-to-end service, such as where any of the dialect classification, dialect parameter generation, and/or dynamic adjusting of the speech recognition model based on the generated dialect parameters may be performed remotely, e.g., at a server, and/or locally with the example personal device, based on communication of the respective inputs and/or generated data between the remote device and the local device.

Figure 11:
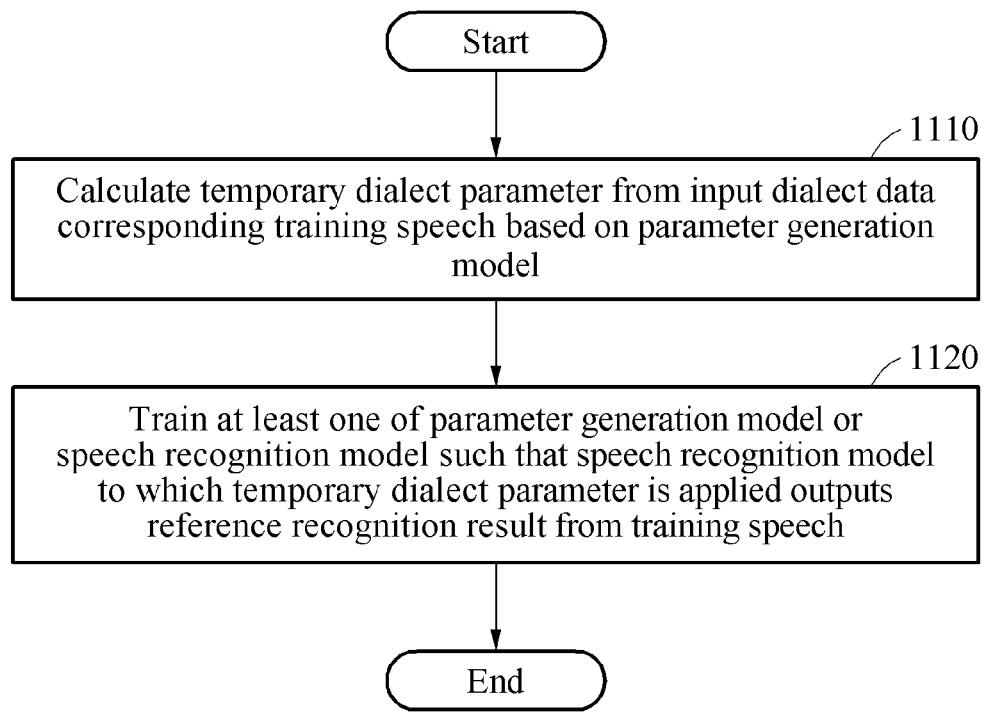
FIG. 11 is a flowchart illustrating an example of a training method to train a speech recognition model.
Figure 12:
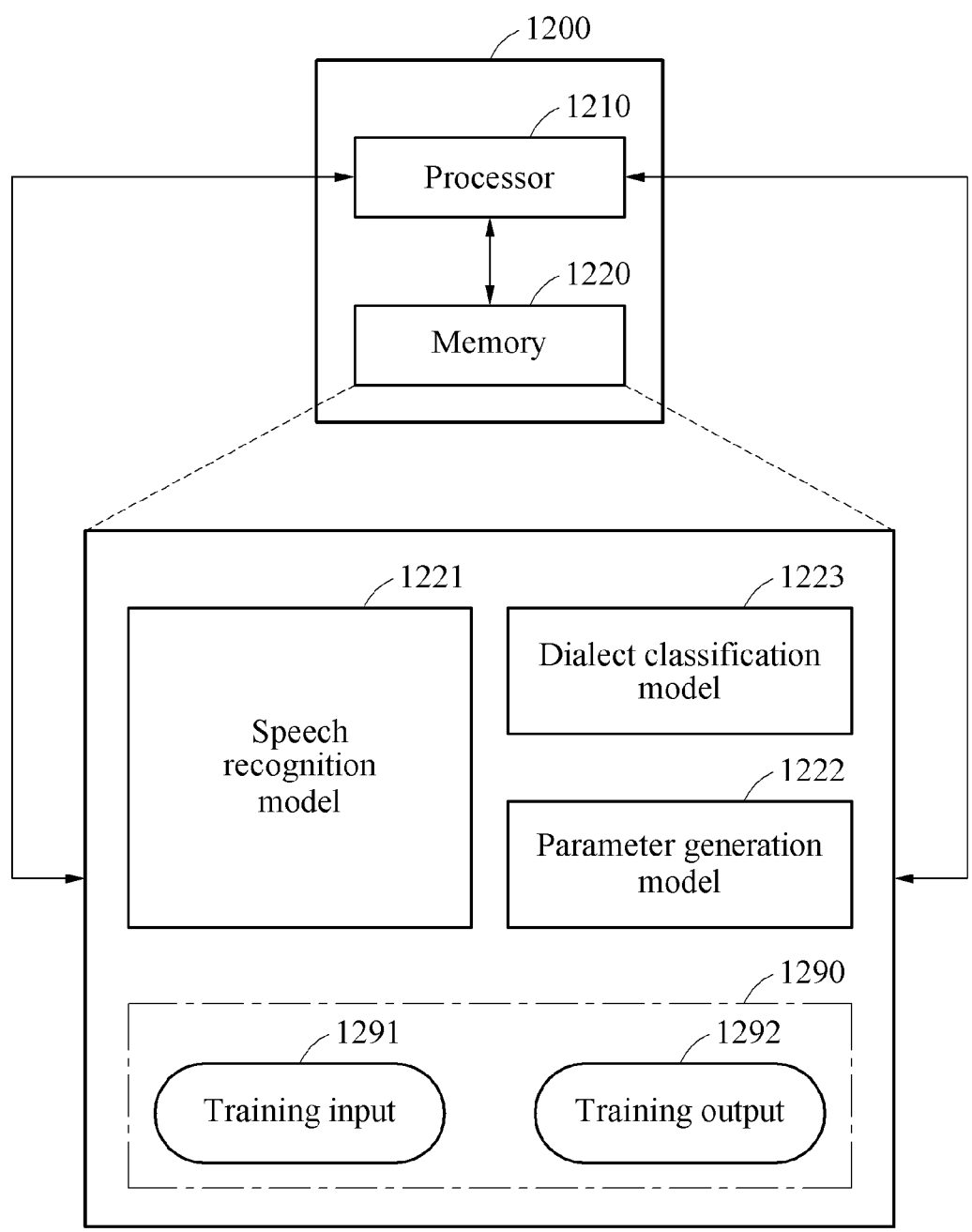
FIG. 12 is a diagram illustrating an example of a training apparatus to train a speech recognition model.

FIG. 11 is a flowchart illustrating an example of a training method to train a speech recognition model. FIG. 12 is a diagram illustrating an example of a training apparatus to train a speech recognition model.

Referring to FIG. 12, a training apparatus 1200 configured to train a speech recognition model 1221 includes a processor 1210 and a memory 1220. The processor 1210 may be configured to perform the following operations to be described hereinafter with reference to FIG. 11, such as through execution of instructions stored in the memory 1220 or otherwise hardware implemented. The memory 1220 may also store the speech recognition model 1221, a parameter generation model 1222, and a dialect classification model 1223, such as by storing information of the structure of the respective models, their internal biases, and corresponding trained parameters. The memory 1220 may also temporarily store a training speech recognition model, training parameter generation model, and training dialect classification model, which are respectively updated and modified through the training operation(s) to generate the trained speech recognition model 1221, the trained parameter generation model 1222, and the trained dialect classification model 1223, though hereinafter the training performed to ultimately generate such models through the respective trainings of the interim models and temporary storage of the updated/modified interim models, for simplicity of explanation, will merely be referred to as training of the speech recognition model 1221, training of the parameter generation model 1222, and training of dialect classification model 1223. In addition, the memory 1220 may store training data 1290.

The training data 1290 may include paired training input 1291 and training output 1292 corresponding to the training input 1291, e.g., where the training input may include speech of a corresponding language including multiple dialects in an example that includes an initial common speech training of the speech recognition model 1221 through loss based back propagation, e.g., where the common speech training may include sequentially training the speech recognition model 1221 with different dialect training input 1291 or with intermixed dialect training input 1291. Thus, the training input 1291 may include speech of the corresponding language for multiple dialects, and in an additional or alternative example the training input 1291 may be used in training of the speech recognition model 1221 and the parameter generation model 1222 together, or training of the speech recognition model 1221, the parameter generation model 1222, and the dialect classification model 1223 together, or the speech recognition model 1221 trained separate from the parameter generation model 1222 and the dialect classification model 1223 trained together. In an example, after generation of a temporarily trained speech recognition model, e.g., to a predetermined accuracy or minimum inaccuracy, thereby determining temporary common parameters, the temporary common parameters may be fixed during the training of the parameter generation model 1222, fixed during an initial training of the parameter training model to a predetermined accuracy or minimum inaccuracy and thereafter trained together with the parameter generation model 1221, as non-limiting examples. Still further, in examples where the dialect classification model 1223 generates probability or probabilistic data for complex speech that includes characteristics of multiple dialects, the training input 1291 may include such complex speech. Thus, for explanation purposes through the examples illustrated in FIGS. 11 and 12, the training input 1291 may be a training speech, and the training output 1292 may be a corresponding reference recognition result, for example, a reference utterance or correct recognition of the corresponding paired training speech. In addition, the training input 1291 may further include input dialect data, for example, training dialect information or labels, corresponding to the training speech.

Referring to FIG. 11, in operation 1110, the training apparatus 1200 calculates temporary dialect parameters from the training dialect information using a training parameter generation model 1222, where the parameter generation model 1222 is either initially trained separate from the remainder of the system or includes initialized parameters. The training apparatus 1200 may calculate temporary dialect parameters by propagating the training dialect information from an input layer up to an output layer of the parameter generation model 1222 for which training is not yet completed. The temporary dialect parameters indicate an output of the parameter generation model 1222 for which the training is not yet completed.

In operation 1120, the training apparatus 1200 trains at least one of the parameter generation model 1222 and the speech recognition model 1221 such that the speech recognition model 1221 to which the temporary dialect parameters are applied outputs the reference recognition result from the training speech. The training apparatus 1200 may apply the temporary dialect parameters to the speech recognition model 1221 for which the training is not yet completed.

The training apparatus 1200 may then output a temporary output by propagating the training speech from an input layer up to an output layer of the speech recognition model 1221 to which the temporary dialect parameters are applied, i.e., the temporarily tuned speech recognition model. The training apparatus 1200 may calculate a loss based on the temporary output and the reference recognition result. The loss may be defined by various objective functions, but not be limited to a specific one. The training apparatus 1200 may update parameters of the parameter generation model 1222 and the speech recognition model 1221 such that the loss based on the temporary output and the reference recognition result is minimized. The training apparatus 1200 may update the respective parameters of both the parameter generation model 1222 and the speech recognition model 1221 through backpropagation. However, examples are not limited to what is described in the foregoing, and the training apparatus 1200 may update parameters of one of the parameter generation model 1222 and the speech recognition model 1221, or first update parameters of one of the parameter generation model 1222 and the speech recognition model 1221 and then update parameters of the other one of the parameter generation model 1222 and the speech recognition model 1221. The training apparatus 1200 may repeat such operations of calculating a temporary output, calculating a loss, and updating parameters of the parameter generation model 1222 and the speech recognition model 1221 until the loss converges or reaches a threshold low loss level.

The dialect classification model 1223 illustrated in FIG. 12 may also be a separately trained model, e.g., separately from the training of the speech recognition model 1221 and the parameter generation model 1222. For example, the training apparatus 1200 may train the dialect classification model 1223 to output dialect information from a speech signal using training speech of various dialects. For example, the training apparatus 1200 may calculate a temporary dialect output by propagating this training speech from an input layer up to an output layer of the dialect classification model 1223. The training apparatus 1200 may update parameters of the dialect classification model 1223 such that the loss between the temporary dialect output and a correspondingly provided or otherwise known reference dialect information is minimized.

Additionally, or alternatively, the training apparatus 1200 may train the dialect classification model 1223 together with the speech recognition model 1221 and the parameter generation model 1222. For example, the training apparatus 1200 may calculate the temporary dialect parameters by propagating the temporary dialect output to the parameter generation model 1222 for which training is not yet completed. Similar to what is described above, the training apparatus 1200 may calculate the temporary output through the speech recognition model 1221 to which the temporary dialect parameters are applied. The training apparatus 1200 may train, simultaneously or sequentially, at least one of the speech recognition model 1221, the parameter generation model 1222, and the dialect classification model 1223 such that the loss based on the temporary output and the reference recognition result is minimized.

The speech recognition apparatuses, servers, and systems, the training apparatuses, processors, processor 920, memories, memory 930, input and output interface 910, and other apparatuses, modules, devices, and other components described herein with respect to FIGS. 1-12 are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated and discussed with respect to FIGS. 1-12 and that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented speech recognition method, the method comprising:
   obtaining a speech signal; and
   performing a recognition of the speech signal, including
      generating a dialect parameter, for the speech signal, from input dialect data using a parameter generation model,
      applying the dialect parameter to a trained speech recognition model to generate a dialect speech recognition model, and
      generating a speech recognition result from the speech signal by implementing, with respect to the speech signal, the dialect speech recognition model,
   wherein the applying of the dialect parameter comprises applying the dialect parameter, or respective dialect parameters generated using the parameter generation model, to at least respective portions of each of one or more layers of the trained speech recognition model.

2. A non-transitory computer-readable storage medium storing instructions that, when executed by a processor, cause the processor to perform the method of claim 1.

3. The method of claim 1,
   wherein the trained speech recognition model is a neural network model with at least the one or more layers, each of the one or more layers including at least a node connected to one or more hierarchically previous layer nodes and/or one or more temporally previous nodes according to respective weighted connections, and
   wherein the applying of the dialect parameter, or the respective dialect parameters, includes inserting a connection weighting or setting, replacing, or modifying respective connection weights in each of the one or more layers, less than all of the respective weighted connections.

4. The method of claim 3,
wherein the dialect parameter, or the respective dialect parameters, further comprise one or more respective scale matrices,
wherein the applying of the dialect parameter, or the respective dialect parameters, further includes applying, during the implementing of the dialect speech recognition model, the one or more respective scale matrices to respective outputs of one or more hidden layers of the dialect speech recognition model.

5. The method of claim 4,
wherein the dialect parameter, or the respective dialect parameters, further comprise one or more respective batch parameters,
wherein the one or more respective batch parameters each include a first batch parameter $\gamma$ and a second batch parameter $\beta$, and
wherein the applying of the dialect parameter, or the respective dialect parameters, further includes applying, during the implementing of the dialect speech recognition model, the one or more respective batch parameters to respective inputs to one or more hidden layers of the dialect speech recognition model by, for each of the one or more hidden layers, multiplying a respective input by the first batch parameter $\gamma$ and adding the second batch parameter $\beta$, and forwarding respective results of the applied one or more respective batch parameters respectively to the one or more hidden layers.

6. The method of claim 5, wherein the respective inputs are normalized respective inputs, and the respective batch parameters are respective batch normalization parameters.

7. The method of claim 3,
wherein the dialect parameter, or the respective dialect parameters, further comprise one or more respective batch parameters,
wherein the one or more respective batch parameters each include a first batch parameter $\gamma$ and a second batch parameter $\beta$, and
wherein the applying of the dialect parameter, or the respective dialect parameters, further includes applying, during the implementing of the dialect speech recognition model, the one or more respective batch parameters to respective inputs to one or more hidden layers of the dialect speech recognition model by, for each of the one or more hidden layers, multiplying a respective input by the first batch parameter $\gamma$ and adding the second batch parameter $\beta$, and forwarding respective results of the applied one or more respective batch parameters respectively to the one or more hidden layers.

8. The method of claim 7, wherein the respective inputs are normalized respective inputs, and the respective batch parameters are respective batch normalization parameters.

9. The method of claim 1,
wherein the trained speech recognition model is a neural network model with at least the one or more layers, each of the one or more layers including at least a node connected to one or more hierarchically previous layer nodes and/or one or more temporally previous nodes according to respective weighted connections, and
wherein the applying of the dialect parameter includes applying a respective scale matrix, as the dialect parameter or as respective dialect parameters generated by the parameter generation model, to respective outputs of corresponding hidden layers of the dialect speech recognition model during the implementing of the dialect speech recognition model.

10. The method of claim 1,
wherein the dialect parameter includes respective batch parameters, and
wherein the applying of the dialect parameter includes applying, during the implementing of the dialect speech recognition model, the respective batch parameters to respective inputs to one or interim operations of the dialect speech recognition model, the inputs being from an input operation of the dialect speech recognition model or from a previous one or more interim operations of the dialect speech recognition model.

11. The method of claim 10, wherein the trained speech recognition model is a neural network model with at least the one or more layers, each of the one or more layers including at least a node connected to one or more hierarchically previous layer nodes and/or one or more temporally previous nodes according to respective weighted connections, and
wherein the applying of the respective batch parameters to the respective inputs includes applying the respective batch parameters to respective inputs of one or more hidden layers of the dialect speech recognition model during the implementing of the dialect speech recognition model.

12. The method of claim 11,
wherein the batch parameter includes a first batch parameter $\gamma$ and a second batch parameter $\beta$, and
wherein the applying of the respective batch parameters to the respective inputs to the one or more hidden layers of the dialect speech recognition model includes, for each of the one or more hidden layers, multiplying a respective input by the first batch parameter $\gamma$ and adding the second batch parameter $\beta$, and forwarding respective results of the applied respective batch parameters respectively to the one or more hidden layers.

13. The method of claim 12, wherein the respective inputs are normalized respective inputs, and the batch parameter is a batch normalization parameter.

14. The method of claim 10,
wherein the batch parameter includes a first batch parameter $\gamma$ and a second batch parameter $\beta$, and
wherein the applying of the respective batch parameters to the respective inputs to the one or more interim operations of the dialect speech recognition model, for each of one or more interim operations, includes multiplying a respective input by the first batch parameter $\gamma$ and adding the second batch parameter $\beta$, and forwarding respective results of the applied respective batch parameters respectively to the one or interim operations of the dialect speech recognition model.

15. The method of claim 14, wherein the respective inputs are normalized respective inputs, and the batch parameter is a batch normalization parameter.

16. The method of claim 1, wherein the generating of the dialect parameter comprises:
in response to a user input received by a user, determining dialect information indicated by the user input to be the input dialect data; and
generating the dialect parameter from the determined input dialect data using the parameter generation model.

17. The method of claim 1, wherein the generating of the dialect parameter comprises:
calculating the input dialect data from the speech signal using a dialect classification model.

18. The method of claim 17, wherein the calculating of the input dialect data comprises:
calculating, as the input dialect data and using the dialect classification model, probability data associated with a dialect to which the speech signal belongs from the speech signal.

19. The method of claim 17, wherein the calculating of the input dialect data comprises:
determining an output of at least one layer of the dialect classification model to be the input dialect data while calculating further dialect information from the speech signal using the dialect classification model.

20. The method of claim 1, wherein the generating of the dialect parameter comprises:
calculating the input dialect data from an output of at least one implemented layer of the dialect speech recognition model.

21. The method of claim 1, wherein the input dialect data is the speech signal.

22. The method of claim 1, wherein the parameter generation model, in the use of the parameter generation model to generate the dialect parameter, considers feature data output from at least respective portions of each of one or more implemented layers of the dialect speech recognition model.

23. The method of claim 1, wherein the generating of the dialect parameter comprises:
generating dialect parameters for each of one or more layers of the dialect speech recognition model, based on a consideration of, by the parameter generation model, respective data output from a respective preceding layer of the one or more layers.

24. The method of claim 1, wherein the generating of the dialect parameter comprises:
obtaining, as the input dialect data, data indicating a dialect group among dialect groups for the speech signal.

25. The method of claim 1, wherein the generating of the dialect parameter comprises:
maintaining previously generated dialect parameters with respect to a previous speech recognition by a previous speech recognition model using previously applied and generated dialect parameters, for use in recognition of subsequently obtained speech signals, until new input dialect data is generated with respect to another user.

26. The method of claim 1, wherein the generating of the dialect parameter comprises:
in response to a determination that a dialect group to which a current user belongs differs from a dialect group to which a previous user belongs, obtaining new input dialect data of the current user as the input dialect data.

27. The method of claim 1, wherein the implementing of the dialect speech recognition model includes calculating a result of a recognizing of the speech signal by a unit of phoneme.

28. The method of claim 1, further comprising:
retraining the parameter generation model based on the speech signal and the input dialect data corresponding to the speech signal.

29. The method of claim 1, further comprising:
storing in a memory the generated dialect parameter and the input dialect data corresponding to the speech signal, and
selectively implementing, in a performed recognition of a subsequent speech, the generating of the dialect parameter for the subsequent speech based on a determination of whether dialect data generated by a dialect classification model for the subsequent speech matches the stored input dialect data, and, when the dialect data is determined to match the stored dialect data, bypassing the generation of the dialect parameter for the subsequent speech, and the implementing of the dialect speech recognition model for the subsequent speech, and implementing the dialect speech recognition model to generate a speech recognition result for the subsequent speech.

30. The method of claim 1, further comprising:
identifying a language of a user and selecting a trained speech recognition model, from among plural respective different language trained speech recognition models stored in a memory, corresponding to the identified language,
wherein the applying of the dialect parameter includes applying the dialect parameter to the selected trained speech recognition model to generate the dialect speech recognition model.

31. The method of claim 1, wherein the generating of the dialect parameter comprises:
dynamically generating a dialect parameter each time a speech signal is obtained.

32. The method of claim 1, wherein the generating of the speech recognition result comprises:
obtaining normalized data by normalizing the speech signal; and
implementing the dialect speech recognition model with respect to the normalized data to generate the speech recognition result.

33. A speech recognition apparatus comprising:
one or more memories storing a parameter generation model, a trained speech recognition model, and instructions; and
a processor, which by executing the instructions is configured to:
generate a dialect parameter, for an obtained speech signal, from input dialect data using the parameter generation model;
apply the generated dialect parameter to the trained speech recognition model to generate a dialect speech recognition model; and
generate a speech recognition result through an implementation, with respect to the speech signal, of the dialect speech recognition model to generate the speech recognition result for the speech signal,
wherein the processor is configured to apply the dialect parameter, or respective dialect parameters generated using the parameter generation model, to at least respective portions of each of one or more layers of the trained speech recognition model.

34. The speech recognition apparatus of claim 33, wherein the applying of the generated dialect parameter to the trained speech recognition model and the generation of the speech recognition results are performed concurrently by the processor,
with the processor being configured to generate dialect parameters for each of one or more layers of the trained speech recognition model based on a consideration of, by the parameter generation model, respective data output from a respective preceding layer of the one or more layers of the dialect speech recognition model.

35. The speech recognition apparatus of claim 33, further comprising a microphone, wherein the processor is further configured to control the microphone to capture the speech signal for the obtaining of the speech signal.

36. The speech recognition apparatus of claim 33,
wherein the trained speech recognition model is a neural network model with at least the one or more layers, each of the one or more layers including at least a node connected to one or more hierarchically previous layer nodes and/or one or more temporally previous nodes according to respective weighted connections, and
wherein the applying of the dialect parameter, or the respective dialect parameters, includes inserting a connection weighting or setting, replacing, or modifying respective connection weights in each of the one or more layers, less than all of the respective weighted connections.

37. The speech recognition apparatus of claim 33,
wherein the trained speech recognition model is a neural network model with at least the one or more layers, each of the one or more layers including at least a node connected to one or more hierarchically previous layer nodes and/or one or more temporally previous nodes according to respective weighted connections, and
wherein the applying of the dialect parameter includes applying a respective scale matrix, as the dialect parameter or as respective dialect parameters generated by the parameter generation model, to respective outputs of one or more hidden layers of the dialect speech recognition model during the implementing of the dialect speech recognition model.

38. The speech recognition apparatus of claim 33,
wherein the dialect parameter includes respective batch parameters, and
wherein the applying of the dialect parameter includes applying the respective batch parameters to respective inputs to one or interim operations of the dialect speech recognition model, the inputs being from an input operation of the dialect speech recognition model or from a previous one or more interim operations of the dialect speech recognition model.

39. The speech recognition apparatus of claim 38, wherein the trained speech recognition model is a neural network model with at least the one or more layers, each of the one or more layers including at least a node connected to one or more hierarchically previous layer nodes and/or one or more temporally previous nodes according to respective weighted connections, and
wherein the applying of the respective batch parameters to the respective inputs includes applying the respective batch parameters to respective inputs to one or more hidden layers of the dialect speech recognition model.

40. The speech recognition apparatus of claim 39,
wherein the batch parameter includes a first batch parameter $\gamma$ and a second batch parameter $\beta$, and
wherein the applying of the respective batch parameters to the respective inputs to the one or more hidden layers of the dialect speech recognition model includes, for each of the one or more hidden layers, multiplying a respective input by the first batch parameter $\gamma$ and adding the second batch parameter $\beta$, and forwarding respective results of the applied respective batch parameters respectively to the one or more hidden layers.

41. The speech recognition apparatus of claim 40, wherein the respective inputs are normalized respective inputs, and the batch parameter is a batch normalization parameter.

42. The speech recognition apparatus of claim 33, wherein the processor is configured to determine, to be the input dialect data, dialect information indicated by a user input received from a user, and generate the dialect parameter from the determined input dialect data using the parameter generation model.

43. The speech recognition apparatus of claim 33, wherein the processor is configured to calculate the input dialect data from the speech signal using a dialect classification model.

44. The speech recognition apparatus of claim 33, wherein the input dialect data is the speech signal.

45. The speech recognition apparatus of claim 33, wherein the parameter generation model, in the use of the parameter generation model to generate the dialect parameter, considers feature data output from at least respective portions of each of one or more layers of the dialect speech recognition model.

46. A speech recognition apparatus comprising:
one or more memories storing a parameter generation model, a dialect classification model, a trained speech recognition model, and instructions, where the trained speech recognition model is a neural network model with at least the one or more layers, each of the one or more layers including at least a node connected to one or more hierarchically previous layer nodes and/or one or more temporally previous nodes according to respective weighted connections; and
a processor, which by executing the instructions is configured to:
generate an input dialect data, by using the dialect classification model with respect to an obtained speech signal, where the input dialect data is a determined indication of a classified dialect of the speech signal or probabilistic data of a complex dialect of the speech signal;
generate respective dialect parameters from the input dialect data using the parameter generation model;
apply the respective dialect parameters to the trained speech recognition model to generate a dialect speech recognition model; and
generate a speech recognition result through an implementation, with respect to the speech signal, of the dialect speech recognition model to generate the speech recognition result for the speech signal,
wherein the applying of the respective dialect parameters includes inserting a connection weighting or setting, replacing, or modifying respective connection weights in each of the one or more layers, less than all of the respective weighted connections.

\* \* \* \* \*

UNITED STATES PATENT AND TRADEMARK OFFICE
CERTIFICATE OF CORRECTION

PATENT NO. : 11,282,501 B2  
APPLICATION NO. : 16/656700  
DATED : March 22, 2022  
INVENTOR(S) : Sanghyun Yoo, Yoshua Bengio and Inchul Song Page 1 of 1

It is certified that error appears in the above-identified patent and that said Letters Patent is hereby corrected as shown below:

On the Title Page

Item (73) Assignee, Replace "Samsung Electronics Co., Ltd., Suwon-si (KR)" with "Samsung Electronics Co., Ltd., Suwon-si (KR); Universite De Montreal, Montreal (CA)"

Signed and Sealed this  
Eleventh Day of October, 2022

Katherine Kelly Vidal  
*Director of the United States Patent and Trademark Office*